US008293695B2

(12) United States Patent
Höhener

(10) Patent No.: US 8,293,695 B2
(45) Date of Patent: Oct. 23, 2012

(54) SHADING COMPOSITION

(75) Inventor: Alfred Höhener, Magden (CH)

(73) Assignee: BASF SE, Ludwigshafen (DE)

( * ) Notice: Subject to any disclaimer, the term of this patent is extended or adjusted under 35 U.S.C. 154(b) by 1035 days.

(21) Appl. No.: 10/567,203

(22) PCT Filed: Jul. 28, 2004

(86) PCT No.: PCT/EP2004/051627
§ 371 (c)(1), (2), (4) Date: Feb. 3, 2006

(87) PCT Pub. No.: WO2005/014769
PCT Pub. Date: Feb. 17, 2005

(65) Prior Publication Data

US 2006/0205624 A1 Sep. 14, 2006

(30) Foreign Application Priority Data

Aug. 6, 2003 (EP) .................................... 03102447

(51) Int. Cl.
*C11D 3/00* (2006.01)
*C09B 47/04* (2006.01)
*C09B 31/08* (2006.01)

(52) U.S. Cl. ............... 510/301; 8/115.56; 8/442; 8/574; 8/587; 8/661; 8/681; 8/684; 8/688; 510/446; 510/452; 510/516; 534/702

(58) Field of Classification Search ............. 8/536, 587, 8/650, 585, 598, 681, 684, 688, 919, 444, 8/115.52, 446, 917, 924, 490, 442, 115.56, 8/574, 661; 510/301, 516, 446, 452; 544/216, 544/113; 540/598; 534/702
See application file for complete search history.

(56) References Cited

U.S. PATENT DOCUMENTS

| | | | | |
|---|---|---|---|---|
| 3,762,859 | A | 10/1973 | Wixon et al. | 8/18 |
| 4,405,329 | A * | 9/1983 | Abel et al. | 8/527 |
| 5,211,719 | A * | 5/1993 | Kaser | 8/527 |
| 5,853,929 | A * | 12/1998 | Campbell | 430/45.5 |
| 5,916,481 | A * | 6/1999 | Willey | 252/186.21 |
| 6,262,005 | B1 | 7/2001 | Willey et al. | 510/301 |
| 6,291,412 | B1 | 9/2001 | Kvita et al. | 510/301 |
| 7,799,098 | B2 * | 9/2010 | Hohener et al. | 8/661 |
| 2003/0087790 | A1 | 5/2003 | Puelle Andrade et al. | 510/444 |
| 2003/0087791 | A1 * | 5/2003 | Bonelli et al. | 510/444 |
| 2009/0105108 | A1 * | 4/2009 | Hohener et al. | 510/303 |

FOREIGN PATENT DOCUMENTS

| | | | |
|---|---|---|---|
| DE | 3125495 | | 5/1982 |
| GB | 916532 | * | 1/1963 |
| JP | 62025171 | * | 2/1987 |

OTHER PUBLICATIONS

English language abstract for DE 3125495, May 19, 1982.

* cited by examiner

*Primary Examiner* — Bijan Ahvazi
(74) *Attorney, Agent, or Firm* — Shiela A. Loggins

(57) ABSTRACT

The present invention relates to a composition comprising at one photocatalyst and at least one azo dyestuff and/or at least one triphenylmethane dyestuff, which produces in the CIElab color coordinate system a relative hue angle of 220-320°, to a detergent composition, a fabric softener composition as well as to a shading.

12 Claims, No Drawings

SHADING COMPOSITION

The present invention relates to a composition comprising at least one photocatalyst and at least one azo dyestuff and/or at least one triphenylmethane dyestuff, which produces in the CIElab colour coordinate system a relative hue angle of 220-320°, to a detergent composition, to a fabric softener composition as well as to a shading process using such a mixture.

A frequently employed method in bleaching and whitening is to use violet or blue dyes concurrently in order to improve the bleaching and whitening effect. If such a dye is used in conjunction with a fluorescent whitening agent, this can serve two different purposes. On the one hand, it is possible to try to achieve an increase in the degree of whiteness by compensating for the yellow of the fabric, in which case the white shade produced by the fluorescent whitening agent on the fabric is largely retained. On the other hand, the object can be to effect with the dye in question a change in the shade of the white effect produced by the fluorescent whitening agent on the fabric, in which case too an attempt is made additionally to achieve an increase in the degree of whiteness. It is thus possible to adjust the desired shade of the white effect.

Shading processes of materials such as paper and textile fabrics are known from e.g. DE 3125495.

These disclosed shading processes, respectively the disclosed mixtures of photocatalyst and dyestuff are not suitable for a regular use, such as in detergent or softener formulations, because the dyestuffs do accumulate with every use and after a few uses the fabrics are coloured.

Therefore, the goal of the present invention was to find a mixture of at least one photocatalyst and at least one azo and/or triphenylmethane dyestuff, which does not lead to a colouration of the fabric.

This problem was solved by a composition comprising at least one photocatalyst and at least one azo dyestuff and/or at least one triphenylmethane dyestuff, which produces a relative hue angle of 220-320°, which is not light stable. That means that the components of the mixture, when applied to the fabric are destroyed by light.

Surprisingly, when the dyestuff as such (without the photocatalyst) is applied to the fabric, it is not destroyed (or destroyed much slower).

Therefore the present invention relates to a composition comprising at least one photocatalyst and at least one azo dyestuff and/or at least one triphenylmethane dyestuff, which produce a relative hue angle of 220-320° and wherein the dyestuff component is degraded when the composition is exposed to light.

Colour coordinates and colour differences are expressed using the internationally standardized CIELAB tristimulus values:

a*=red−green (+,−)
b*=yellow−blue (+,−)
L*=lightness (light=100)
C*=chroma
H*=hue (angle of 0°=red, 90°=yellow, 180°=green, 270°=blue), and the colour differences ΔE*, ΔH*, ΔC*, ΔL*, Δa*, and Δb*, together with an identification number of the sample.

This internationally accepted system has been developed by CIE ("Commission Internationale de l'Éclairage"). It is for example part of DIN 6174: 1979-01 as well as DIN 5033-3:1992-07.

Preferably the present invention relates to a composition comprising at least one photocatalyst and at least one azo dyestuff and/or at least one triphenylmethane dyestuff, which produce a relative hue angle of 220-320° and wherein the dyestuff component is degraded when the composition is exposed to sunlight.

More preferably the present invention relates to a composition comprising at least one photocatalyst and at least one azo dyestuff and/or at least one triphenylmethane dyestuff, which produce a relative hue angle of 220-320° and wherein the decrease rate of the azo dyestuff(s) and/or the triphenylmethane dyestuff(s) is at least 1% per 2 hours, preferably at least 2% when the composition is exposed to sunlight.

The degradation of the components can be determined spectrophotometrically.

Preferably, the photocatalyst is a phthalocyanine.

More preferably, the photocatalyst is a water-soluble phthalocyanine of Zn, Fe(II), Ca, Mg, Na, K, Al, Si(IV), P(V), Ti(IV), Ge(IV), Cr(VI), Ga(III), Zr(IV), In(III), Sn(IV) or Hf(VI);

Most preferably, the photocatalyst is a water-soluble phthalocyanine of the formula

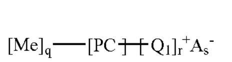

(1a)

or

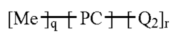

(1b)

in which

PC is the phthalocyanine ring system;

Me is Zn; Fe(II); Ca; Mg; Na; K; Al-$Z_1$; Si(IV); P(V); Ti(IV); Ge(IV); Cr(VI); Ga(III); Zr(IV); In(III); Sn(IV) or Hf(VI);

$Z_1$ is a halide; sulfate; nitrate; carboxylate; alkanolate; or hydroxyl ion;

q is 0; 1 or 2;

r is 1to 4;

$Q_1$ is a sulfo or carboxyl group; or a radical of the formula $—SO_2X_2—R_1—X_3^+$; $—O—R_1—X_3^+$; or $—(CH_2)_t—Y_1^+$;

in which $R_1$ is a branched or unbranched $C_1$-$C_8$alkylene; or 1,3- or 1,4-phenylene;

$X_2$ is —NH—; or —N—$C_1$-$C_5$alkyl;

$X_3^+$ is a group of the formula

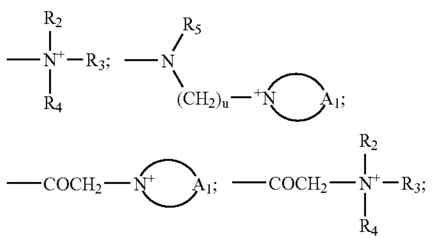

or, in the case where $R_1$=$C_1$-$C_8$alkylene, also a group of the formula

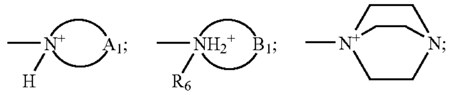

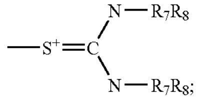

or

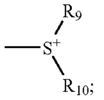

$Y_1^+$ is a group of the formula

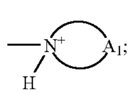

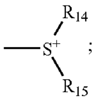

or

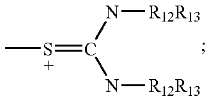

t is 0 or 1;

where in the above formulae $R_2$ and $R_3$ independently of one another are $C_1$-$C_6$alkyl;

$R_4$ is $C_1$-$C_6$alkyl; $C_5$-$C_7$ cycloalkyl or $NR_7R_8$;

$R_5$ and $R_6$ independently of one another are $C_1$-$C_5$alkyl;

$R_7$ and $R_8$ independently of one another are hydrogen or $C_1$-$C_5$alkyl;

$R_9$ and $R_{10}$ independently of one another are unsubstituted $C_1$-$C_6$alkyl or $C_1$-$C_6$alkyl substituted by hydroxyl, cyano, carboxyl, carb-$C_1$-$C_6$alkoxy, $C_1$-$C_6$alkoxy, phenyl, naphthyl or pyridyl;

u is from 1 to 6;

$A_1$ is a unit which completes an aromatic 5- to 7-membered nitrogen heterocycle, which may where appropriate also contain one or two further nitrogen atoms as ring members, and $B_1$ is a unit which completes a saturated 5- to 7-membered nitrogen heterocycle, which may where appropriate also contain 1 to 2 nitrogen, oxygen and/or sulfur atoms as ring members;

$Q_2$ is hydroxyl; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulfo or carboxyl radical; a radical of the formula

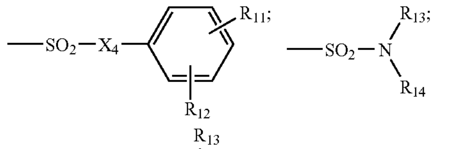

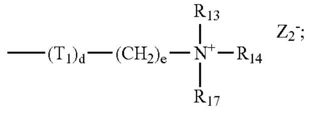

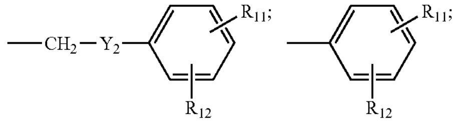

$—SO_2(CH_2)_v—OSO_3M$; $—SO_2(CH_2)_v—SO_3M$;

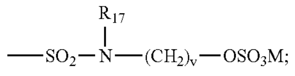

-continued

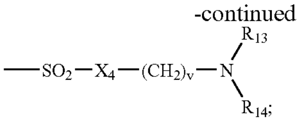

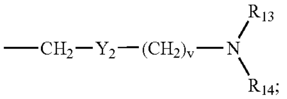

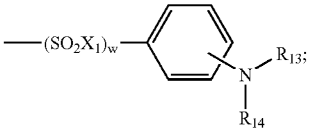

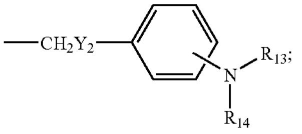

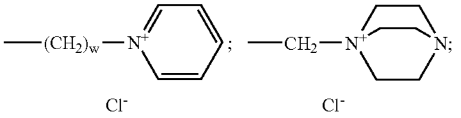

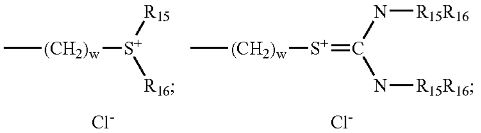

a branched alkoxy radical of the formula

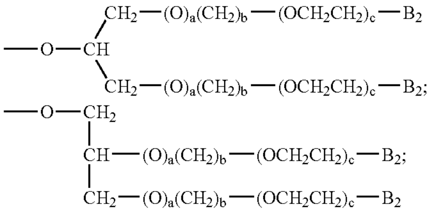

an alkylethyleneoxy unit of the formula $—(T_1)_d—(CH_2)_b(OCH_2CH_2)_a—B_3$ or an ester of the formula $COOR_{18}$ in which $B_2$ is hydrogen; hydroxyl; $C_1$-$C_{30}$alkyl; $C_1$-$C_{30}$alkoxy; $—CO_2H$; $—CH_2COOH$; $—SO_3^-M_1$; $—OSO_3^-M_1$; $—PO_3^{2-}M_1$; $—OPO_3^{2-}M_1$; and mixtures thereof;

$B_3$ is hydrogen; hydroxyl; —COOH; $—SO_3^-M_1$; $—OSO_3^-M_1$ or $C_1$-$C_6$alkoxy;

$M_1$ is a water-soluble cation;

$T_1$ is —O—; or —NH—;

$X_1$ and $X_4$ independently of one another are —O—; —NH— or —N—$C_1$-$C_5$alkyl;

$R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N—$C_1$-$C_5$alkyl;

$R_{13}$ and $R_{14}$ independently of one another are hydrogen; $C_1$-$C_6$alkyl; hydroxy-$C_1$-$C_6$alkyl; cyano-$C_1$-$C_6$alkyl; sulfo-$C_1$-$C_6$alkyl; carboxy or halogen-$C_1$-$C_6$alkyl; unsubstituted phenyl or phenyl substituted by halogen, $C_1$-$C_4$alkyl or $C_1$-$C_4$alkoxy; sulfo or carboxyl or $R_{13}$ and $R_{14}$ together with the nitrogen atom to which they are bonded form a saturated 5- or 6-membered heterocyclic ring which may additionally also contain a nitrogen or oxygen atom as a ring member;

$R_{15}$ and $R_{16}$ independently of one another are $C_1$-$C_6$alkyl or aryl-$C_1$-$C_6$alkyl radicals;

$R_{17}$ is hydrogen; an unsubstituted $C_1$-$C_6$alkyl or $C_1$-$C_6$alkyl substituted by halogen, hydroxyl, cyano, phenyl, carboxyl, carb-$C_1$-$C_6$alkoxy or $C_1$-$C_6$alkoxy;

$R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof;

M is hydrogen; or an alkali metal ion or ammonium ion, $Z_2^-$ is a chlorine; bromine; alkylsulfate or aralkylsulfate ion;

a is 0 or 1;

b is from 0to 6;

c is from 0 to 100;

d is 0; or 1;

e is from 0 to 22;

v is an integer from 2 to 12;

w is 0 or 1; and $A^-$ is an organic or inorganic anion, and s is equal to r in cases of monovalent anions $A^-$ and is $\leqq r$ in cases of polyvalent anions, it being necessary for $A_s^-$ to compensate the positive charge; where, when $r \neq 1$, the radicals $Q_1$ can be identical or different, and where the phthalocyanine ring system may also comprise further solubilising groups.

The number of substituents $Q_1$ and $Q_2$ in the formula (1a) and (1b) respectively, which may be identical or different, is between 1 and 8, and it is not imperative, as is generally the case with phthalocyanines, for it to be an integer (degree of substitution). If other noncationic substituents are present, the sum of the latter and the cationic substituents is between 1 and 4. The minimum number of substituents which must be present in the molecule is governed by the solubility of the resulting molecule in water. It is sufficiently soluble in water when enough of the phthalocyanine compound dissolves to effect a photodynamically catalysed oxidation on the fibre. A solubility as low as 0.01 mg/l may suffice, although one of from 0.001 to 1 g/l is generally advantageous.

Halogen means fluorine, bromine or, in particular, chlorine.

Especially suitable groups

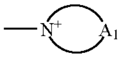

are:

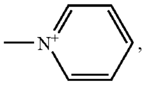, 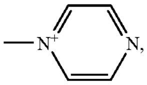, 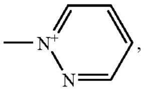,

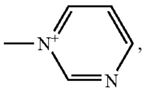, 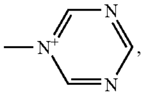, 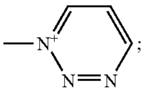; etc..

Preference is given to the group

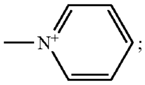;

Suitable heterocyclic rings in the group

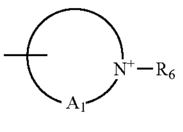

are likewise the groups listed above, the bond to the other substituents merely being via a carbon atom.

In all of these substituents, phenyl, naphthyl and aromatic hetero rings may be substituted by one or two further radicals, for example by $C_1$-$C_6$alkyl, $C_1$-$C_6$alkoxy, halogen, carboxyl, carb-$C_1$-$C_6$alkoxy, hydroxyl, amino, cyano, sulfo, sulfonamido, etc.

Preference is given to a substituent from the group $C_1$-$C_6$alkyl, $C_1$-$C_6$alkoxy, halogen, carboxyl, carb-$C_1$-$C_6$alkoxy or hydroxyl.

Particularly suitable groups

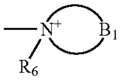

are:

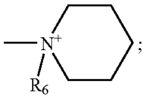; 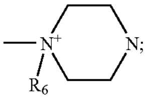; 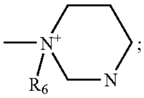;

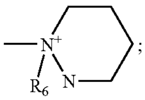; 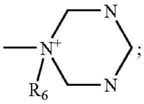; 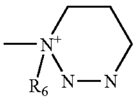;

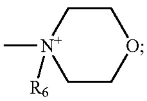; 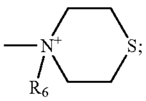;

etc, wherein $B_1$ and $R_6$ have the same meaning as defined above.

All of the aforementioned nitrogen heterocycles can also be substituted by alkyl groups, either on a carbon atom or on another nitrogen atom in the ring. The alkyl group is preferably the methyl group.

$A^-_s$ in formula (1a) is, as a counterion to the positive charge on the remainder of the molecule, any anion. In general, it is introduced by the preparation process (quaternization).

It is then preferably a halogen ion, an alkylsulfate or an arylsulfate ion. Arylsulfate ions which may be mentioned are the phenylsulfonate, p-tolylsulfonate and the p-chlorophenylsulfonate ion. The anion can however also be any other anion since the anions can be readily exchanged in a known manner; $A_s^-$ can thus also be a sulfate, sulfite, carbonate, phosphate, nitrate, acetate, oxalate, citrate, lactate ion or another anion of an organic carboxylic acid. The index s is the same as r for monovalent anions. For polyvalent anions, s has a value $\leqq r$, in which case it must be chosen, depending on the conditions, such that it exactly balances the positive charge on the remainder of the molecule.

$C_1$-$C_6$alkyl and $C_1$-$C_6$alkoxy are straight-chain or branched alkyl or alkoxy radicals, such as, for example, methyl, ethyl, n-propyl, isopropyl, n-butyl, sec-butyl, tert-butyl, amyl, isoamyl, tert-amyl or hexyl or methoxy, ethoxy, n-propoxy, isopropoxy, n-butoxy, sec-butoxy, tert-butoxy, amyloxy, isoamyloxy, tert-amyloxy or hexyloxy.

$C_2$-$C_{22}$alkenyl is, for example, allyl, methallyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-dodec-2-enyl or n-octadec-4-enyl.

Preferred photobleaching agents of the formula (1a) have the formula (2a)

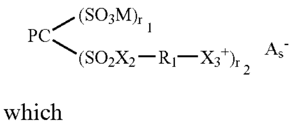

in which

PC, $X_2$, $X_3$, and $R_1$ are as defined above;

M is hydrogen; an alkali metal ion; ammonium ion or amine salt ion;

and the sum of the numbers $r_1$ and $r_2$ is from 1 to 4 and $A_s^-$ balances exactly the positive charge on the remainder of the molecule, and in particular the formula $[PC]—[SO_2NHR_1'—X_3'^{30}A'^{-}]_{r_1}$, in which (3)

PC is as defined in formula (1a), $R_1'$ is $C_2$-$C_6$alkylene;

$r_1$ is a number from 1 to 4;

$X_3'^{+}$ is a group of the formula

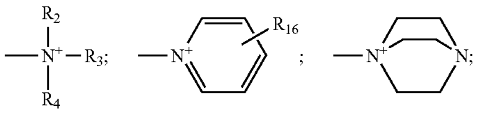

or

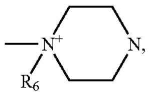

in which $R_2$ and $R_3$ independently of one another are unsubstituted $C_1$-$C_4$alkyl or $C_1$-$C_4$alkyl substituted by hydroxyl, cyano, halogen or phenyl;

$R_4$ is $R_2$; cyclohexyl or amino;

$R_6$ is $C_1$-$C_4$alkyl;

$R_{16}$ is $C_1$-$C_4$alkyl; $C_1$-$C_4$alkoxy; halogen; carboxyl; carb-$C_1$-$C_4$alkoxy or hydroxyl; and $A'^-$ is a halide; alkylsulfate or arylsulfate ion;

it being possible for the radicals $—SO_2NHR'_1—X_3'^{+}A'^{-}$ to be identical or different.

Other photobleaching agents which can be used according to the invention have the formula (4)

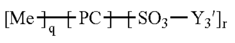

in which

PC is the phthalocyanine ring system;

Me is Zn; Fe(II); Ca; Mg; Na; K; Al-$Z_1$; Si(IV); P(V); Ti(IV); Ge(IV); Cr(VI); Ga(III); Zr(IV); In(III); Sn(IV) or Hf(VI);

$Z_1$ is a halide; sulfate; nitrate; carboxylate; alkanolate; or hydroxyl ion;

q is 0; 1; or 2;

$Y_3'$ is hydrogen; an alkali metal ion or ammonium ion; and r is any number from 1 to 4.

Very particularly preferred phthalocyanine compounds have the formula (4a), (4a)

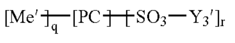

in which

Me is Zn or Al-$Z_1$;

$Z_1$ is a halide; sulfate; nitrate; carboxylate; alkanolate; or hydroxyl ion,

PC is the phthalocyanine ring system, q is 0; 1; or 2;

$Y_3'$ is hydrogen; an alkali metal ion or ammonium ion; and r is any number from 1 to 4.

Other interesting phthalocyanine compounds which can be used according to the invention have the formula (5)

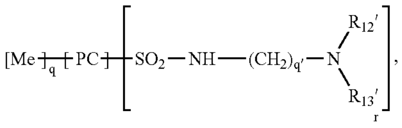

in which

PC, Me and q are as defined in formula (4);

$R_{12}'$ and $R_{13}'$ independently of one another are hydrogen; phenyl; sulfophenyl; carboxyphenyl; $C_1$-$C_6$alkyl; hydroxy-$C_1$-$C_6$alkyl; cyano-$C_1$-$C_6$alkyl; sulfo-$C_1$-$C_6$alkyl; carboxy-$C_1$-$C_6$alkyl or halogen-$C_1$-$C_6$alkyl or $R_{12}'$ and $R_{13}'$ together with the nitrogen atom form the morpholine ring;

q' is an integer from 2 to 6; and r is a number from 1 to 4;

where, if r is >1, the radicals

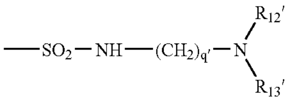

present in the molecule may be identical or different.

Further interesting phthalocyanine compounds which can be used according to the invention have the formula (6)

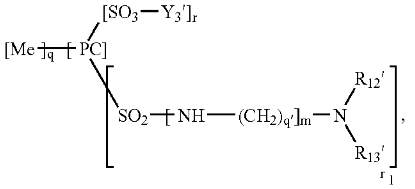

in which

PC, Me and q are as defined in formula (4), $Y'_3$ is hydrogen; an alkali metal ion or ammonium ion, q' is an integer from 2 to 6;

$R_{12}'$ and $R_{13}'$ independently of one another are hydrogen; phenyl; sulfophenyl; carboxyphenyl; $C_1$-$C_6$alkyl; hydroxy-$C_1$-$C_6$alkyl; cyano-$C_1$-$C_6$alkyl; sulfo-$C_1$-$C_6$alkyl; carboxy-$C_1$-$C_6$alkyl or halogen-$C_1$-$C_6$alkyl or $R_{12}'$ and $R_{13}'$ together with the nitrogen atom form the morpholine ring;

m' is 0 or 1; and r and $r_1$ independently of one another are any number from 0.5 to 3, the sum $r+r_1$ being at least 1, but no more than 4.

If the central atom Me in the phthalocyanine ring is Si(IV), the phthalocyanines used according to the invention may also have axial substituents ($=R_{19}$) in addition to the substituents on the phenyl ring of the phthalocyanine ring. Such phthalocyanines have, for example, the formula (7)

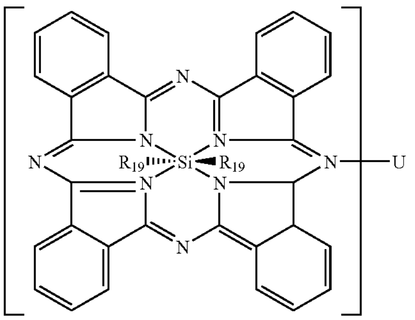

in which $R_{19}$ is hydroxyl; $C_1$-$C_{22}$alkyl; branched $C_3$-$C_{22}$alkyl; $C_1$-$C_{22}$alkenyl; branched $C_3$-$C_{22}$alkenyl and mixtures thereof, $C_1$-$C_{22}$alkoxy; a sulfo or carboxyl radical; a radical of the formula

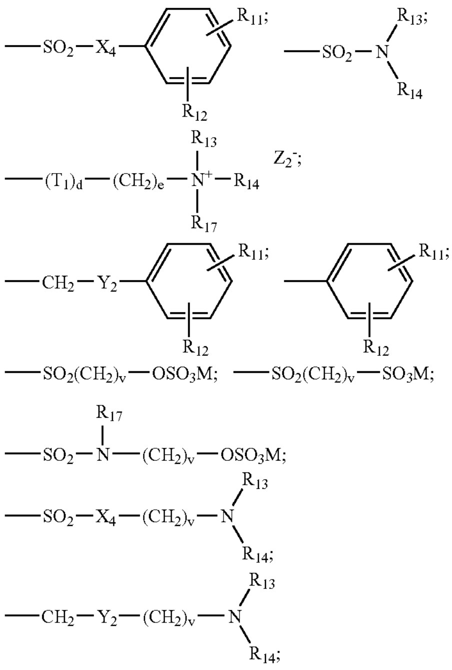

-continued

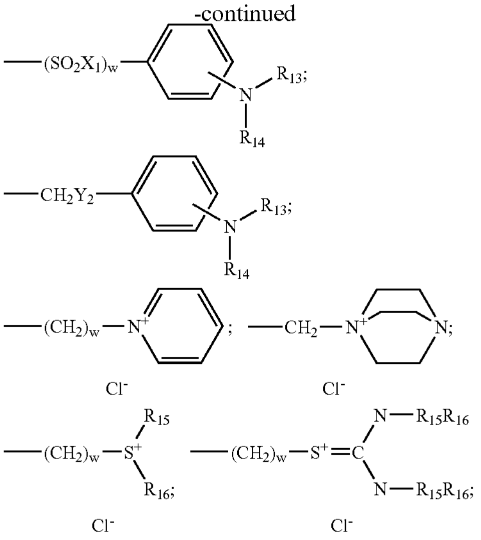

a branched alkoxy radical of the formula

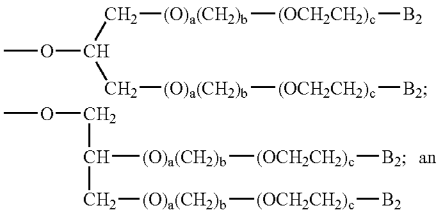

an alkylethyleneoxy unit of the formula $-(T_1)_d-(CH_2)_b(OCH_2CH_2)_a-B_3$ or an ester of the formula $COOR_{18}$; and U is $[Q_1]_r^+A_s^-$; or $Q_2$, wherein $R_{11}$, $R_{12}$, $R_{13}$, $R_{14}$, $R_{15}$, $R_{16}$, $R_{17}$, $R_{18}$, $B_2$, $B_3$, M, $Q_1$, $Q_2$, $A^-$, $T_1$, $X_1$, $X_4$, $Y_2$, $Z_2^-$, a, b, c, d, e, r, s, v, w are as defined in the formulae (1a) and (1b).

Especially preferred phthalocyanine compounds are such compounds which are commercially available and used in washing agent compositions. Usually, the anionic phthalocyanine compounds are in the form of alkali metal salts, especially sodium salts.

Suitable azo dyes are for example such as described in U.S. Pat. No. 5,211,719 of formulae

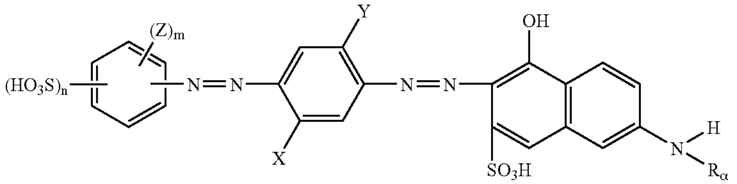

or

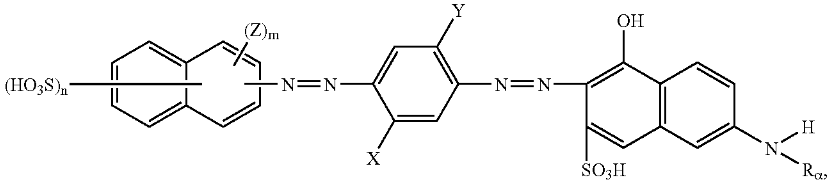

wherein

X and Y, independently of one another, are each hydrogen; $C_1$-$C_4$-alkyl or $C_1$-$C_4$-alkoxy, Rα is hydrogen or aryl, Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof.

Preferably, the azo dyestuffs are compounds of the following formulae

-continued (E)

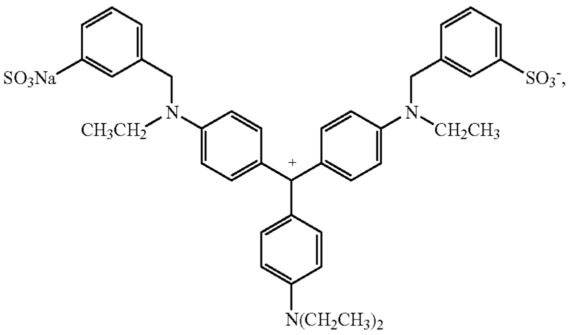

(A)

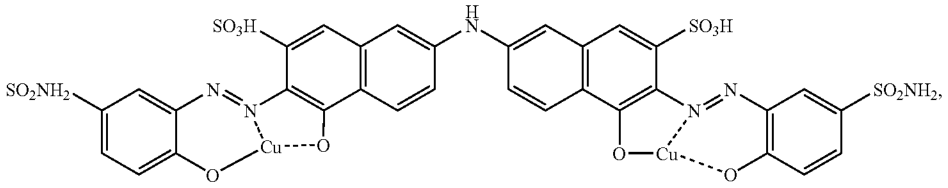

(B)

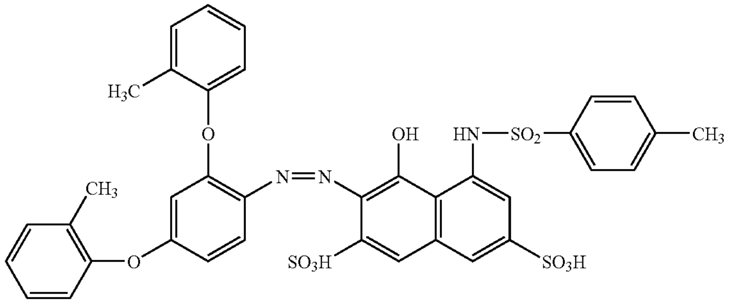

and (C)

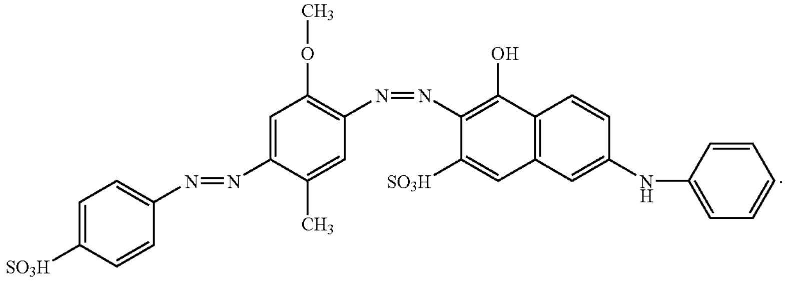

Preferably, the triphenylmethane dyestuffs are compounds of the following formulae:

(D)

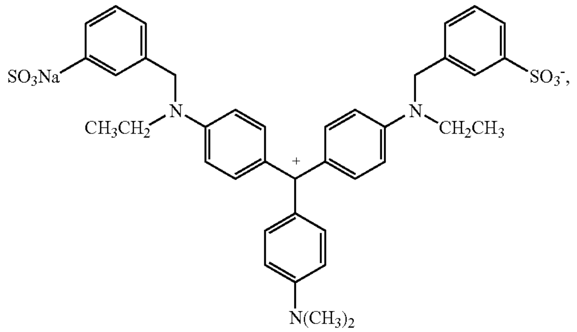

-continued (F)

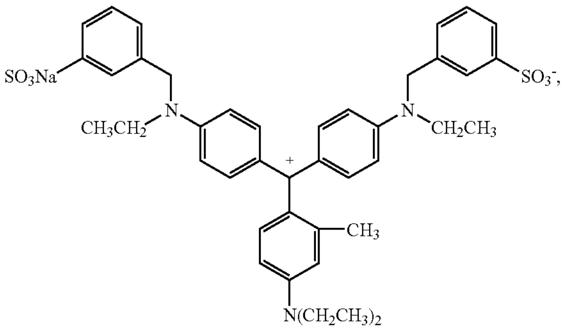

-continued (G)

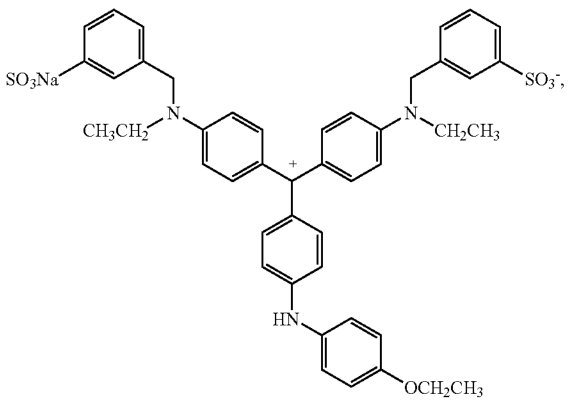

(H)

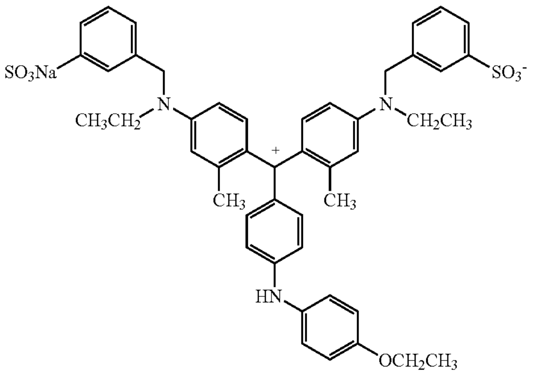

and (I)

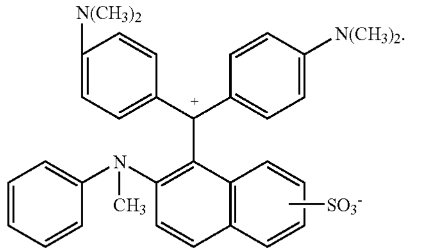

A preferred embodiment of the present invention is a composition comprising at least one phthalocyanine compound and at least one azo dyestuff of formulae wherein X and Y, independently of one another, are each hydrogen; $C_1$-$C_4$-alkyl or $C_1$-$C_4$-alkoxy, $R_\alpha$ is hydrogen or aryl, Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff of formula (D), (E), (F), (G), (H) and/or (I), which produces a relative hue angle of 220-320° and wherein the dyestuff component is degraded when the composition is exposed to light.

A more preferred embodiment of the present invention is a composition comprising at least one phthalocyanine compound of formula (1a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I), which produces a relative hue angle of 220-320° and wherein the dyestuff component is degraded when the composition is exposed to sunlight.

The composition, which comprises at least one photocatalyst and at least one azo dyestuff and/or at least one triphenylmethane dyestuff, can be used in solid or liquid formulation.

A further embodiment is a solid formulation comprising a composition, which comprises at least one photocatalyst and at least one azo dyestuff and/or at least one triphenylmethane dyestuff.

A preferred embodiment of the present invention is a solid formulation comprising at least one composition, which comprises at least one phthalocyanine compound and at least one azo dyestuff of formulae

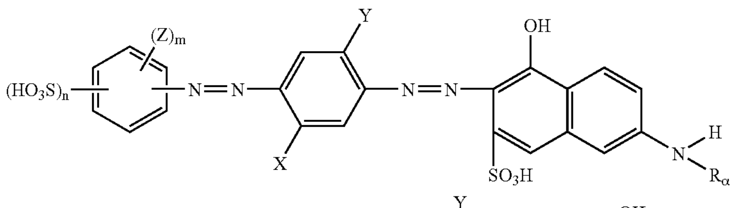

or

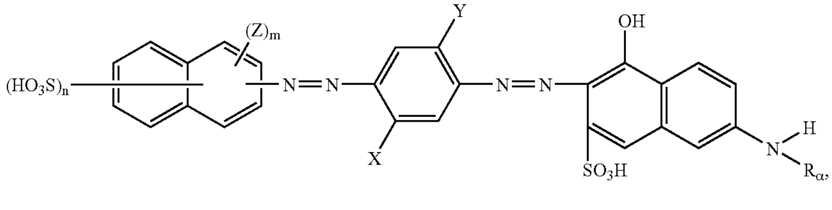

,

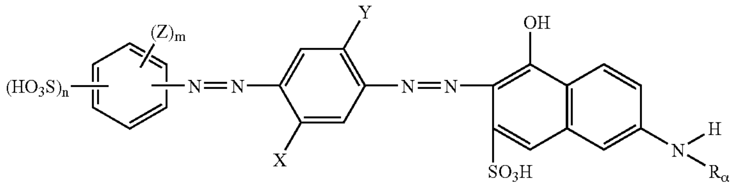
or

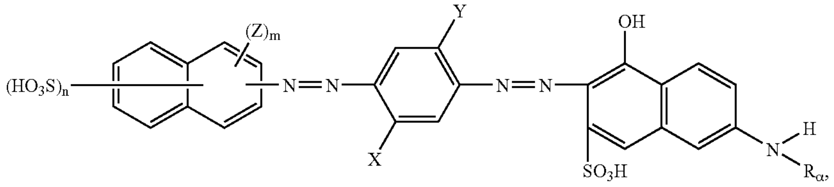

wherein

X and Y, independently of one another, are each hydrogen; $C_1$-$C_4$-alkyl or $C_1$-$C_4$-alkoxy, $R_\alpha$ is hydrogen or aryl, Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff of formula (D), (E), (F), (G), (H) and/or (I).

A more preferred embodiment of the present invention is a solid formulation comprising at least one composition, which comprises at least one phthalocyanine compound and at least one azo dyestuff of formula (A), (B), and/or (C) and/or at least one triphenylmethane dyestuff of formula (D), (E), (F), (G), (H) and/or (I).

A preferred embodiment of the present invention is a solid formulation comprising a composition, which comprises at least one phthalocyanine compound of formula (1a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I).

Granulates are preferred as solid formulation.

The present invention also relates to granulates comprising a) from 2 to 75% by weight (wt-%) of at least one composition comprising
   at least one water-soluble phthalocyanine compound and at least one azo dyestuff and/or at least one triphenylmethane dyestuff as defined above, based on the total weight of the granulate, b) from 10 to 95 wt-% of at least one further additive, based on the total weight of the granulate, and c) from 0 to 15 wt-% water, based on the total weight of the granulate.

The sum of the wt-% of components a)-c) is always 100%.

The preferences for the phthalocyanines, for the azo and triphenylmethane dyestuffs as defined above also apply for the solid and/or granular formulation.

A preferred embodiment of the present invention relates to granulates comprising a) from 2 to 75 wt-% of the composition comprising
   at least one phthalocyanine compound and
   at least one azo dyestuff of formulae

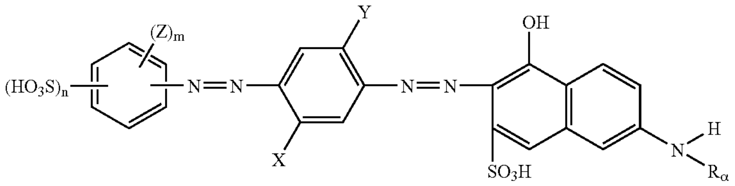

or

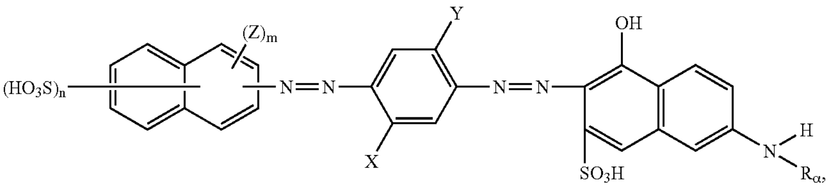

wherein

X and Y, independently of one another, are each hydrogen;

$C_1$-$C_4$-alkyl or $C_1$-$C_4$-alkoxy, $R_\alpha$ is hydrogen or aryl,

Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff of formula (D), (E), (F), (G), (H) and/or (I) as defined above, based on the total weight of the granulate, b) from 10 to 95 wt-% of at least one further additive, based on the total weight of the granulate, and c) from 0 to 15 wt-% water, based on the total weight of the granulate.

A more preferred embodiment of the present invention relates to granulates comprising a) from 2 to 75 wt-% of at least one composition comprising at least one phthalocyanine compound of formula (1a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I) as defined above, based on the total weight of the granulate, b) from 10 to 95 wt-% of at least one further additive, based on the total weight of the granulate, and c) from 0 to 15 wt-% water, based on the total weight of the granulate.

The granulates according to the invention can be encapsulated or not.

Encapsulating materials include especially water-soluble and water-dispersible polymers and waxes. Of those materials, preference is given to polyethylene glycols, polyamides, polyacrylamides, polyvinyl alcohols, polyvinylpyrrolidones, gelatin, hydrolysed polyvinyl acetates, copolymers of vinylpyrrolidone and vinyl acetate, and also polyacrylates, paraffins, fatty acids, copolymers of ethyl acrylate with methacrylate and methacrylic acid, and polymethacrylates.

The granulates according to the invention contain from 2 to 75 wt-%, preferably from 2 to 60 wt-%, especially from 5 to 55 wt-%, of component a), based on the total weight of the granulate.

The granulates in the formulations according to the invention contain from 10 to 95 wt-%, preferably from 10 to 85 wt-%, especially from 10 to 80 wt-%, of at least one further additive (component c)), based on the total weight of the granulate.

Such further additives may be anionic or non-ionic dispersing agents; water-soluble organic polymers; inorganic salt; low-molecular-weight organic acid or a salt thereof; wetting agents; disintegrants such as, for example, powdered or fibrous cellulose, microcrystalline cellulose; fillers such as, for example, dextrin; water-insoluble or water-soluble dyes or pigments; and also dissolution accelerators and optical brighteners. Aluminium silicates such as zeolites, and also compounds such as talc, kaolin, $TiO_2$, $SiO_2$ or magnesium trisilicate may also be used in small amounts.

The anionic dispersing agents used are, for example, the commercially available water-soluble anionic dispersing agents for dyes, pigments etc.

The following products, especially, come into consideration: condensation products of aromatic sulfonic acids and formaldehyde, condensation products of aromatic sulfonic acids with unsubstituted or chlorinated biphenyls or biphenyl oxides and optionally formaldehyde, (mono-/di-)alkylnaphthalenesulfonates, sodium salts of polymerised organic sulfonic acids, sodium salts of polymerised alkylnaphthalenesulfonic acids, sodium salts of polymerised alkylbenzenesulfonic acids, alkylarylsulfonates, sodium salts of alkyl polyglycol ether sulfates, polyalkylated polynuclear arylsulfonates, methylene-linked condensation products of arylsulfonic acids and hydroxyarylsulfonic acids, sodium salts of dialkylsulfosuccinic acids, sodium salts of alkyl diglycol ether sulfates, sodium salts of polynaphthalene-methanesulfonates, ligno- or oxyligno-sulfonates or heterocyclic polysulfonic acids.

Especially suitable anionic dispersing agents are condensation products of naphthalene-sulfonic acids with formaldehyde, sodium salts of polymerised organic sulfonic acids, (mono-/di-)alkylnaphthalenesulfonates, polyalkylated polynuclear arylsulfonates, sodium salts of polymerised alkylbenzenesulfonic acid, lignosulfonates, oxylignosulfonates and condensation products of naphthalenesulfonic acid with a polychloromethylbiphenyl.

Suitable non-ionic dispersants are especially compounds having a melting point of, preferably, at least 35° C. that are emulsifiable, dispersible or soluble, for example the following compounds:

1. fatty alcohols having from 8 to 22 carbon atoms, especially cetyl alcohol;
2. addition products of, preferably, from 2 to 80 mol of alkylene oxide, especially ethylene oxide, wherein some of the ethylene oxide units may have been replaced by substituted epoxides, such as styrene oxide and/or propylene oxide, with higher unsaturated or saturated monoalcohols, fatty acids, fatty amines or fatty amides having from 8 to 22 carbon atoms or with benzyl alcohols, phenyl phenols, benzyl phenols or alkyl phenols, the alkyl radicals of which have at least 4 carbon atoms;
3. alkylene oxide, especially propylene oxide, condensaton products (block polymers);
4. ethylene oxide/propylene oxide adducts with diamines, especially ethylenediamine;
5. reaction products of a fatty acid having from 8 to 22 carbon atoms and a primary or secondary amine having at least one hydroxy-lower alkyl or lower alkoxy-lower alkyl group, or alkylene oxide addition products of such hydroxyalkyl-group-containing reaction products;
6. sorbitan esters, preferably with long-chain ester groups, or ethoxylated sorbitan esters, such as polyoxyethylene sorbitan monolaurate having from 4 to 10 ethylene oxide units or polyoxyethylene sorbitan trioleate having from 4 to 20 ethylene oxide units;
7. addition products of propylene oxide with a tri- to hexahydric aliphatic alcohol having from 3 to 6 carbon atoms, e.g. glycerol or pentaerythritol; and
8. fatty alcohol polyglycol mixed ethers, especially addition products of from 3 to 30 mol of ethylene oxide and from 3 to 30 mol of propylene oxide with aliphatic monoalcohols having from 8 to 22 carbon atoms.

Especially suitable non-ionic dispersants are surfactants of formula $$R_{20}\text{—O-(alkylene-O)}_n\text{—}R_{21} \quad (8),$$

wherein $R_{20}$ is $C_8$-$C_{22}$alkyl or $C_8$-$C_{18}$alkenyl;

$R_{21}$ is hydrogen; $C_1$-$C_4$alkyl; a cycloaliphatic radical having at least 6 carbon atoms or benzyl;

"alkylene" is an alkylene radical having from 2 to 4 carbon atoms and n is a number from 1 to 60.

The substituents $R_{20}$ and $R_{21}$, in formula (8) are advantageously each the hydrocarbon radical of an unsaturated or, preferably, saturated aliphatic monoalcohol having from 8 to 22 carbon atoms. The hydrocarbon radical may be straight-chain or branched. $R_{20}$ and $R_{21}$ are preferably each independently of the other an alkyl radical having from 9 to 14 carbon atoms.

Aliphatic saturated monoalcohols that come into consideration include natural alcohols, e.g. lauryl alcohol, myristyl alcohol, cetyl alcohol or stearyl alcohol, and also synthetic alcohols, e.g. 2-ethylhexanol, 1,1,3,3-tetramethylbutanol, octan-2-ol, isononyl alcohol, trimethylhexanol, trimethylnonyl alcohol, decanol, $C_9$-$C_{11}$oxo-alcohol, tridecyl alcohol, isotridecyl alcohol and linear primary alcohols (Alfols) having from 8 to 22 carbon atoms. Some examples of such Alfols are Alfol (8-10), Alfol (9-11), Alfol (10-14), Alfol (12-13) and Alfol (16-18). ("Alfol" is a registered trade mark).

Unsaturated aliphatic monoalcohols are, for example, dodecenyl alcohol, hexadecenyl alcohol and oleyl alcohol.

The alcohol radicals may be present singly or in the form of mixtures of two or more components, e.g. mixtures of alkyl and/or alkenyl groups that are derived from soybean fatty acids, palm kernel fatty acids or tallow oils.

(Alkylene-O) chains are preferably divalent radicals of the formulae

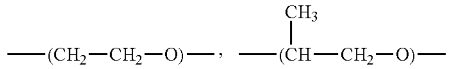

and

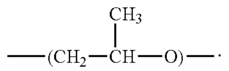

Examples of a cycloaliphatic radical are cycloheptyl, cyclooctyl and preferably cyclohexyl. As non-ionic dispersants there come into consideration preferably surfactants of formula (9)

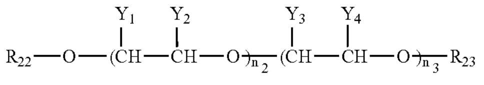

wherein $R_{22}$ is $C_8$-$C_{22}$alkyl;

$R_{23}$ is hydrogen or $C_1$-$C_4$alkyl;

$Y_1$, $Y_2$, $Y_3$ and $Y_4$ are each independently of the others hydrogen; methyl or ethyl;

$n_2$ is a number from 0 to 8; and $n_3$ is a number from 2 to 40.

Further important non-ionic dispersants correspond to formula (10)

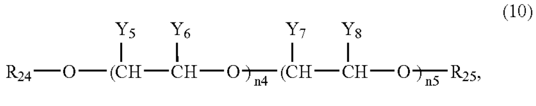

wherein $R_{24}$ is $C_9$-$C_{14}$alkyl;

$R_{25}$ is $C_1$-$C_4$alkyl;

$Y_5$, $Y_6$, $Y_7$ and $Y_8$ are each independently of the others hydrogen; methyl or ethyl, one of the radicals $Y_5$, $Y_6$ and one of the radicals $Y_7$, $Y_8$ always being hydrogen; and $n_4$ and $n_5$ are each independently of the other an integer from 4 to 8.

The non-ionic dispersants of formulae (8) to (10) can also be used in the form of mixtures.

For example, as surfactant mixtures there come into consideration non-end-group-terminated fatty alcohol ethoxylates of formula (8), e.g. compounds of formula (8) wherein $R_{20}$ is $C_8$-$C_{22}$alkyl, $R_{21}$ is hydrogen and the alkylene-O chain is the radical $—(CH_2—CH_2—$ and also end-group-terminated fatty alcohol ethoxylates of formula (10).

Examples of non-ionic dispersants of formulae (8), (9) and (10) include reaction products of a $C_{10}$-$C_{13}$fatty alcohol, e.g. a $C_{13}$oxo-alcohol, with from 3 to 10 mol of ethylene oxide, propylene oxide and/or butylene oxide or the reaction product of one mol of a $C_{13}$fatty alcohol with 6 mol of ethylene oxide and 1 mol of butylene oxide, it being possible for the addition products each to be end-group-terminated with $C_1$-$C_4$alkyl, preferably methyl or butyl.

Such dispersants can be used singly or in the form of mixtures of two or more dispersants.

Instead of or in addition to the dispersing agent or agents, the granulates according to the invention may comprise a water-soluble organic polymer, which may also have dispersing properties. Such polymers may be used singly or as mixtures of two or more polymers. As water-soluble polymers (which may, but need not, have film-forming properties), there come into consideration, for example, gelatins, polyacrylates, polymethacrylates, copolymers of ethyl acrylate, methyl methacrylate and methacrylic acid (ammonium salt), polyvinylpyrrolidones, vinylpyrrolidones, vinyl acetates, copolymers of vinylpyrrolidone with long-chain olefins, poly (vinylpyrrolidone/dimethylaminoethyl methacrylates), copolymers of vinylpyrrolidone/dimethylaminopropyl methacrylamides, copolymers of vinylpyrrolidone/dimethylaminopropyl acrylamides, quaternised copolymers of vinylpyrrolidones and dimethylaminoethyl methacrylates, terpolymers of vinylcaprolactam/vinylpyrrolidone/dimethylaminoethyl methacrylates, copolymers of vinylpyrrolidone and methacrylamidopropyltrimethylammonium chloride, terpolymers of caprolactam/vinylpyrrolidone/dimethylaminoethyl methacrylates, copolymers of styrene and acrylic acid, polycarboxylic acids, polyacrylamides, carboxymethyl cellulose, hydroxymethyl cellulose, polyvinyl alcohols, hydrolysed and non-hydrolysed polyvinyl acetate, copolymers of maleic add with unsaturated hydrocarbons and also mixed polymerisation products of the mentioned polymers. Further suitable substances are polyethylene glycol (MW=2000-20 000), copolymers of ethylene oxide with propylene oxide (MW>3500), condensation products (block polymerisation products) of alkylene oxide, especially propylene oxide, copolymers of vinylpyrrolidone with vinyl acetate, ethylene oxide-propylene oxide addition products with diamines, especially ethylenediamine, polystyrenesulfonic acid, polyethylenesulfonic acid, copolymers of acrylic acid with sulfonated styrenes, gum arabic, hydroxypropyl methylcellulose, sodium carboxymethyl cellulose, hydroxypropyl methylcellulose phthalate, maltodextrin, starch, sucrose, lactose, enzymatically modified and subsequently hydrated sugars, as are obtainable under the name "Isomalt", cane sugar, polyaspartic acid and tragacanth.

Among those water-soluble organic polymers, special preference is given to carboxymethyl cellulose, polyacrylamides, polyvinyl alcohols, polyvinylpyrrolidones, gelatins, hydrolysed polyvinyl acetates, copolymers of vinylpyrrolidone and vinyl acetate, maltodextrins, polyaspartic acid and also polyacrylates and polymethacrylates.

For use as inorganic salts there come into consideration carbonates, hydrogen carbonates, phosphates, polyphosphates, sulfates, silicates, sulfites, borates, halides and pyrophosphates, preferably in the form of alkali metal salts. Preference is given to water-soluble salts such as, for example, alkali metal chlorides, alkali phosphates, alkali carbonates, alkali polyphosphates and alkali sulfates and water-soluble salts used in washing agent and/or washing agent additive formulations.

There come into consideration as low-molecular-weight acids, for example, mono- or polycarboxylic acids. Of special interest are aliphatic carboxylic acids, especially those having a total number of from 1 to 12 carbon atoms. Preferred acids are aliphatic $C_1$-$C_{12}$-mono- or -poly-carboxylic acids, the monocarboxylic acids being especially those having at least 3 carbon atoms in total. As substituents of the carboxylic acids there come into consideration, for example, hydroxy and amino, especially hydroxy. Special preference is given to aliphatic $C_2$-$C_{12}$polycarboxylic acids, especially aliphatic $C_2$-$C_6$polycarboxylic acids. Very special preference is given to hydroxy-substituted aliphatic $C_2$-$C_6$polycarboxylic acids. These compounds may be used in the form of the free acid or a salt, especially an alkali salt.

There may also be used aminopolycarboxylates (e.g. sodium ethylenediaminetetraacetate), phytates, phosphonates, aminopolyphosphonates (e.g. sodium ethylenediaminetetraphosphonate), aminoalkylenepoly(alkylenephosphonates), polyphosphonates, polycarboxylates or water-soluble polysiloxanes.

As examples of low-molecular-weight organic acids and salts thereof there may be mentioned oxalic acid, tartaric acid, acetic acid, propionic acid, succinic acid, maleic acid, citric acid, formic acid, gluconic acid, p-toluenesulfonic acid, terephthalic acid, benzoic acid, phthalic acid, acrylic acid and polyacrylic acid.

The optical brighteners may be selected from a wide range of chemical types such as 4,4'-bis-(triazinylamino)-stilbene-2,2'-disulfonic acids, 4,4'-bis-(triazol-2-yl)stilbene-2,2'-disulfonic acids, 4,4'-(diphenyl)-stilbenes, 4,4'-distyryl-biphenyls, 4-phenyl-4'-benzoxazolyl-stilbenes, stilbenyl-naphthotriazoles, 4-styryl-stilbenes, bis-(benzoxazol-2-yl) derivatives, bis-(benzimidazol-2-yl) derivatives, coumarines, pyrazolines, naphthalimides, triazinyl-pyrenes, 2-styryl-benzoxazole- or -naphthoxazole derivatives, benzimidazole-benzofuran derivatives or oxanilide derivatives.

With particular reference to the use of a composition, which is an aqueous textile finishing composition, preferred 4,4'-bis-(triazinylamino)-stilbene-2,2'-disulfonic acids are those having the formula (11):

(11)

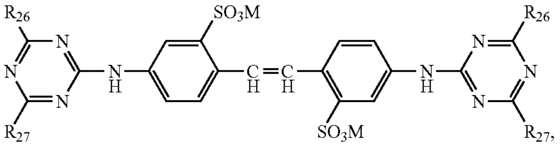

in which $R_{26}$ and $R_{27}$, independently of one another, are phenyl; mono- or disulfonated phenyl; phenylamino; mono- or disulfonated phenylamino; morpholino; —$N(CH_2CH_2OH)_2$; —$N(CH_3)(CH_2CH_2OH)$; —$NH_2$; —$N(C_1$-$C_4alkyl)_2$; —$OCH_3$; —Cl; —NH—$CH_2CH_2SO_3H$ or —NH—$CH_2CH_2OH$; and M is H; Na; K; Ca; Mg; ammonium; mono-, di-, tri- or tetra-$C_1$-$C_4$-alkylammonium; mono-, di-or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (11) are those in which each $R_{26}$ is 2,5-disulfophenyl and each $R_{27}$ is morpholino; or each $R_{26}$ is 2,5-disulfophenyl and each $R_{27}$ is $N(C_2H_5)_2$; or each $R_{26}$ is 3-sulfophenyl and each $R_{27}$ is $NH(CH_2CH_2OH)$ or $N(CH_2CH_2OH)_2$; or each $R_{26}$ is 4-sulfophenyl and each $R_{27}$ is $N(CH_2CH_2OH)_2$; and, in each case, the sulfo group is $SO_3M$ in which M is sodium.

Preferred 4,4'-bis-(triazol-2-yl)stilbene-2,2'-disulfonic acids are those having the formula (12):

(12)

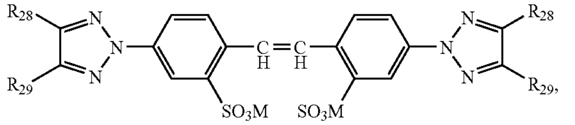

in which $R_{28}$ and $R_{29}$, independently of one another, are H; $C_1$-$C_4$-alkyl; phenyl or monosulfonated phenyl; and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (12) are those in which $R_{28}$ is phenyl, $R_{29}$ is H and M is sodium.

One preferred 4,4'-(diphenyl)-stilbene is that having the formula (13):

(13)

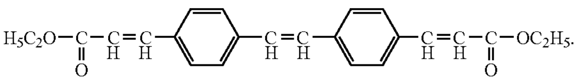

Preferably, 4,4'-distyryl-biphenyls used are those of formula (14):

(14)

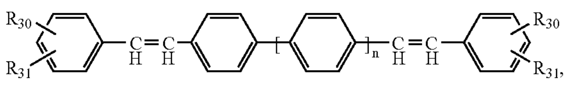

in which $R_{30}$ and $R_{31}$, independently of one another, are H; —$SO_3M$; —$SO_2N(C_1$-$C_4$-alkyl$)_2$;

O—($C_1$-$C_4$-alkyl); CN; Cl; COO($C_1$-$C_4$-alkyl); CON($C_1$-$C_4$-alkyl$)_2$ or $O(CH_2)_3N^{(+)}(CH_3)_2An^{(-)}$ in which $An^{(-)}$ is an anion of an organic or inorganic acid, in particular a formate, acetate, propionate, glycolate, lactate, acrylate, methanephosphonate, phosphite, sulfonate, dimethyl or diethyl phosphite anion , or a mixture thereof, n is 0 or 1 and M is H; Na; K; Ca; Mg; ammonium; mono-, di-, ri- or tetra-$C_1$-$C_4$-alkylammonium; mono-, di- or tri-$C_1$-$C_4$-hydroxy-alkylammonium or ammonium that is di- or tri-substituted with by a mixture of $C_1$-$C_4$-alkyl and $C_1$-$C_4$-hydroxyalkyl groups.

Especially preferred compounds of formula (14) are those in which n is 1 and each $R_{30}$ is a 2-$SO_3M$ group in which M is sodium and each $R_{31}$ is H, or each $R_{31}$ is —$O(CH_2)_3N^{(+)}(CH_3)_2An^{(-)}$ in which $An^{(-)}$ is acetate.

Preferred 4-phenyl-4'-benzoxazolyl-stilbenes have the formula (15):

(15)

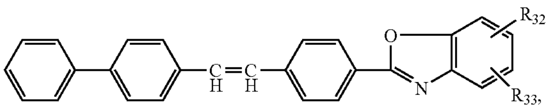

in which $R_{32}$ and $R_{33}$, independently of one another, are H; Cl; $C_1$-$C_4$-alkyl or —$SO_2C_1$-$C_4$-alkyl.

An especially preferred compound of formula (15) is that in which $R_{32}$ is 4-$CH_3$ and $R_{33}$ is 2-$CH_3$.

Preferably, stilbenyl-naphthotriazoles used are those of formula (16):

(16)

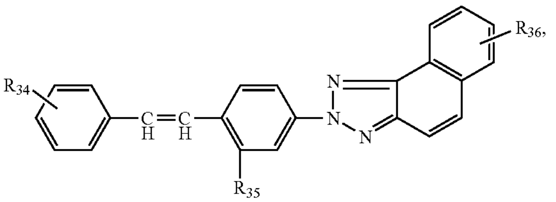

in which $R_{34}$ is H or Cl;

$R_{35}$ is —$SO_3M$; —$SO_2N(C_1$-$C_4$-alkyl$)_2$; —$SO_2O$-phenyl or —CN;

$R_{36}$ is H or —$SO_3M$; and

M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (16) are those in which $R_{34}$ and $R_{35}$ are H and $R_{36}$ is 2-$SO_3M$ in which M is Na.

Preferably, 4-styryl-stilbenes used are those of formula:

(17)

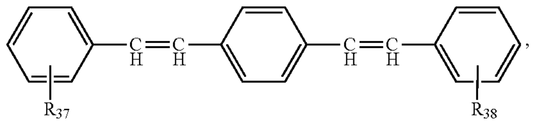

in which $R_{37}$ and $R_{38}$, independently of one another, are H; —$SO_3M$; —$SO_2N(C_1$-$C_4$-alkyl$)_2$;

—O—($C_1$-$C_4$-alkyl); —CN; —Cl; —COO($C_1$-$C_4$-alkyl); —CON($C_1$-$C_4$-alkyl$)_2$ or —$O(CH_2)_3N^{(+)}(CH_3)_2An^{(-)}$ in which $An^{(-)}$ is an anion of an organic or inorganic acid, in particular a formate, acetate, propionate, glycolate, lactate, acrylate, methanephosphonate, phosphite, sulfonate, dimethyl or diethyl phosphite anion , or a mixture thereof.

Especially preferred compounds of formula (17) are those in which each of $R_{37}$ and $R_{38}$ is 2-cyano; 2-$SO_3M$ in which M is sodium or $O(CH_2)_3N^{(+)}(CH_3)_2An^{(-)}$ in which $An^{(-)}$ is acetate.

Preferred bis-(benzoxazol-2-yl) derivatives are those of formula (18):

(18)

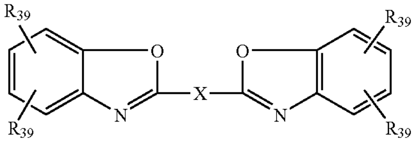

in which $R_{39}$, independently of one another, is H; $C(CH_3)_3$; $C(CH_3)_2$-phenyl; $C_1$-$C_4$-alkyl or COO—$C_1$-$C_4$-alkyl, and X is —CH═CH— or a group of formula:

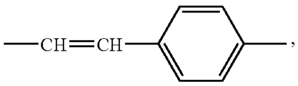,

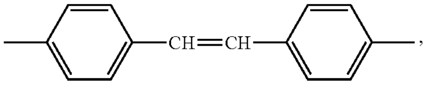,

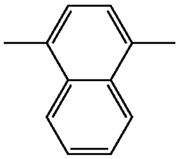 or 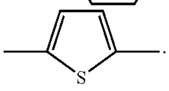.

Especially preferred compounds of formula (18) are those in which each $R_{39}$ is H and X is

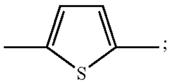;

or one group $R_{39}$ in each ring is 2-methyl and the other $R_{39}$ is H and X is —CH═CH—; or one group $R_{39}$ in each ring is 2-$C(CH_3)_3$ and the other $R_{39}$ is H and X is

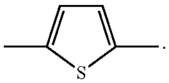.

Preferred bis-(benzimidazol-2-yl) derivatives are those of formula (19):

(19)

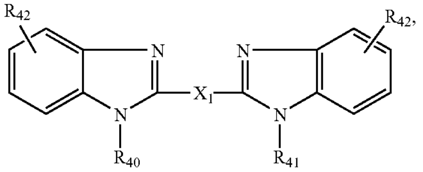

in which $R_{40}$ and $R_{41}$, independently of one another, are H; $C_1$-$C_4$-alkyl or $CH_2CH_2OH$;

$R_{42}$ is H or $SO_3M$;

$X_1$ is =CH=CH— or a group of formula:

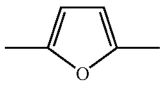

and

M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (19) are those in which $R_{40}$ and $R_{41}$, are each H, $R_{42}$ is $SO_3M$ in which M is sodium and $X_1$ is —CH=CH—.

Preferred coumarines are those of formula:

(20)

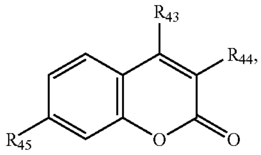

in which $R_{43}$ is H; —Cl or —$CH_2COOH$, $R_{44}$ is H; phenyl; —COO—$C_1$-$C_4$-alkyl or a group of formula:

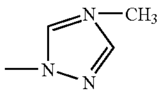

and $R_{45}$ is —O—$C_1$-$C_4$-alkyl; —N($C_1$-$C_4$-alkyl)$_2$; —NH—CO—$C_1$-$C_4$-alkyl or a group of formula:

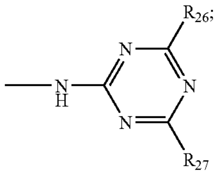

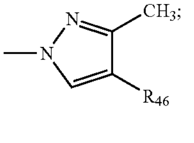

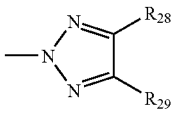

or

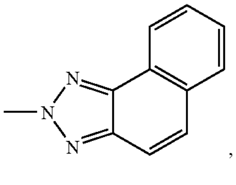

, in which $R_{26}$, $R_{27}$, $R_{28}$ and $R_{29}$ have their previous significance and $R_{46}$ is H; $C_1$-$C_4$-alkyl or phenyl.

Especially preferred compounds of formula (20) are those having the formula (21) and (22):

(21)

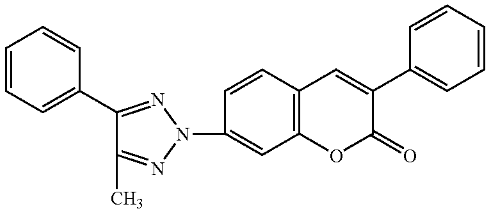

or (22)

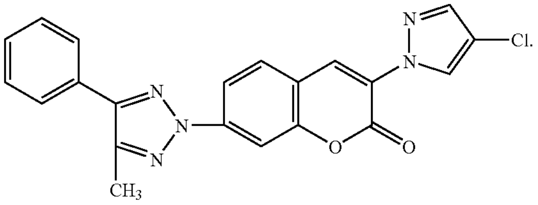

Preferably, pyrazolines used are those having the formula (23):

(23)

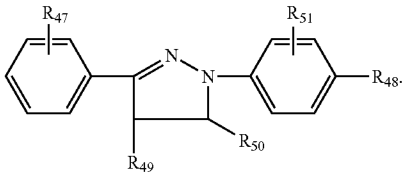

in which $R_{47}$ is H; —Cl or —N($C_1$-$C_4$-alkyl)$_2$, $R_{48}$ is H; —Cl; —$SO_3M$; —$SO_2NH_2$; —$SO_2NH$—($C_1$-$C_4$-alkyl); —COO—$C_1$-$C_4$-alkyl; —$SO_2$-$C_1$-$C_4$-alkyl; —$SO_2NHCH_2CH_2CH_2N^{(+)}(CH_3)_3$ or $SO_2CH_2CH_2N^{(+)}H$ ($C_1$-$C_4$-alkyl)$_2$ $An^{(-)}$, $R_{49}$ and $R_{50}$ are the same or different and each is H; $C_1$-$C_4$-alkyl or phenyl, $R_{51}$ is H or —Cl, $An^{(-)}$ is an anion of an organic or inorganic acid, in particular a formate, acetate, propionate, glycolate, lactate, acrylate, methanephosphonate, phosphite, sulfonate, dimethyl or diethyl phosphite anion, or a mixture thereof and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (23) are those in which $R_{47}$ is —Cl; $R_{48}$ is —$SO_2CH_2CH_2N^{(+)}H$($C_1$-$C_4$-alkyl)$_2$ $An^{(-)}$ in which $An^{(-)}$ is phosphite and $R_{49}$, $R_{50}$ and $R_{51}$ are each H; or those those having the formula (24) and (25):

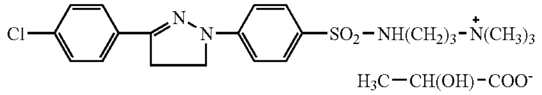

$H_3C-CH(OH)-COO^-$ or

-continued (25)

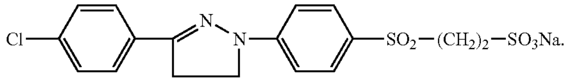

Preferred naphthalimides are those of formula (26):

(26)

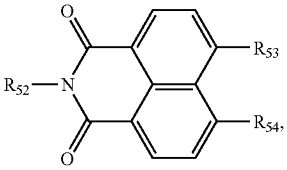

in which $R_{52}$ is $C_1$-$C_4$-alkyl or —$CH_2CH_2CH_2N^{(+)}(CH_3)_3$;

$R_{53}$ and $R_{54}$, independently of one another, are —O—$C_1$-$C_4$-alkyl; —$SO_3M$ or —NH—CO—$C_1$-$C_4$-alkyl; and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (26) are those having the formula (27) and (28):

(27)

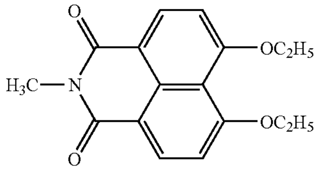

or (28)

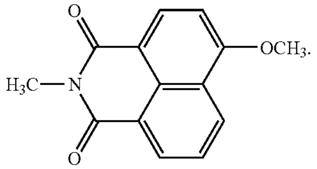

Preferred triazinyl-pyrenes used are those of formula (29):

(29)

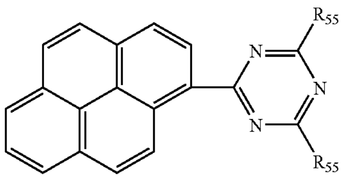

in which each $R_{55}$, independently of one another, is $C_1$-$C_4$-alkoxy.

Especially preferred compounds of formula (29) are those in which each $R_{55}$ is methoxy.

Preferred 2-styryl-benzoxazole- or -naphthoxazole derivatives are those having the formula (30):

(30)

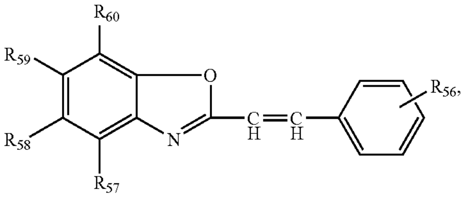

in which $R_{56}$ is —CN; —Cl; —COO—$C_1$-$C_4$-alkyl or phenyl;

$R_{57}$ and $R_{58}$ are the atoms required to form a fused benzene ring or $R_{58}$ and $R_{60}$, independently of one another, are H or $C_1$-$C_4$-alkyl; and $R_{59}$ is H; $C_1$-$C_4$-alkyl or phenyl.

Especially preferred compounds of formula (30) are those in which $R_{56}$ is a 4-phenyl group and each of $R_{57}$ to $R_{60}$ is H.

Preferred benzimidazole-benzofuran derivatives are those having the formula (31):

(31)

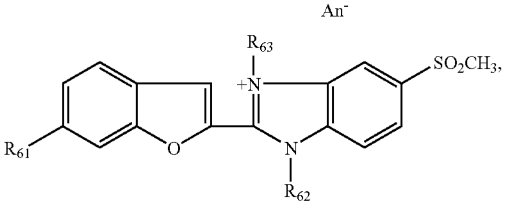

in which $R_{61}$ is $C_1$-$C_4$-alkoxy;

$R_{62}$ and $R_{63}$, independently of one another, are $C_1$-$C_4$-alkyl; and $An^{(-)}$ is an anion of an organic or inorganic acid, in particular a formate, acetate, propionate, glycolate, lactate, acrylate, methanephosphonate, phosphite, sulfonate, dimethyl or diethyl phosphite anion, or a mixture thereof.

A particularly preferred compound of formula (31) is that in which $R_{61}$ is methoxy, $R_{62}$ and $R_{63}$ are each methyl and $An^{(-)}$ is methane sulfonate.

Preferred oxanilide derivatives include those having the formula (32):

(32)

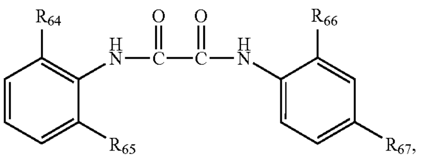

in which $R_{64}$ is $C_1$-$C_4$alkoxy, $R_{66}$ is $C_1$-$C_4$alkyl; $C_1$-$C_4$alkyl-$SO_3M$ or $C_1$-$C_4$alkoxy-$SO_3M$ in which M is H; Na; K; Ca; Mg; ammonium; mono-, di-, tri - or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups and $R_{65}$ and $R_{67}$ are the same and each is hydrogen; tert. butyl or $SO_3M$ in which M has its previous significance.

Preferred FWA are those having one of the formulae:

(33)

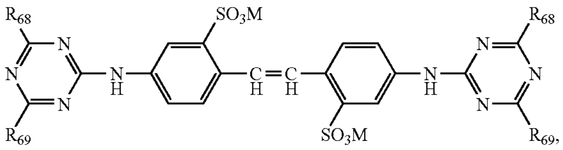

(34)

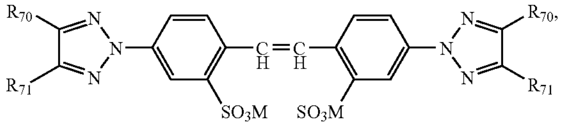

(35)

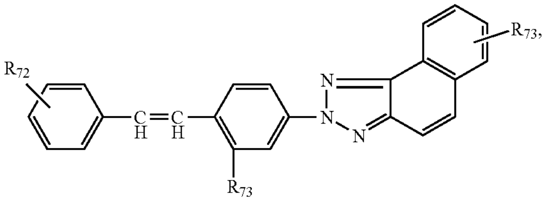

(36)

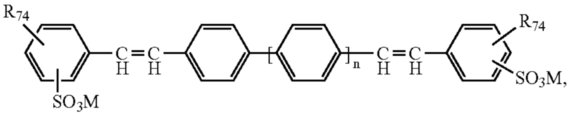

(37)

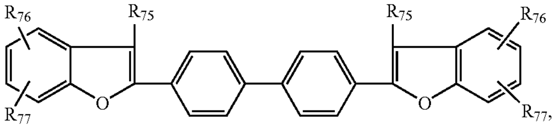

(38)

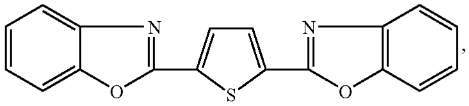

(39)

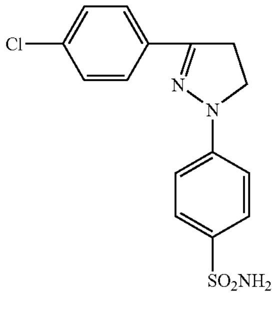

and

-continued (40)

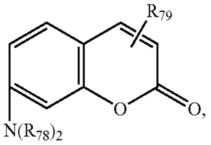

in which $R_{68}$ and $R_{69}$, independently of one another, are —OH; —$NH_2$; —O—$C_1$-$C_4$-alkyl; —O—aryl;

—NH—$C_1$-$C_4$-alkyl; —N($C_1$-$C_4$-alkyl)$_2$; —N($C_1$-$C_4$-alkyl)($C_1$-$C_4$-hydroxyalkyl);

—N($C_1$-$C_4$-hydroxyalkyl)$_2$; —NH-aryl; morpholino; —S—$C_1$-$C_4$-alkyl(aryl) or Cl, $R_{70}$ and $R_{71}$, independently of one another, are H; $C_1$-$C_4$-alkyl; phenyl or a group of formula:

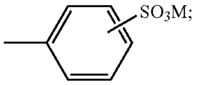

$R_{72}$ is H; —Cl or —$SO_3M$;

$R_{73}$ is —CN; —$SO_3M$; —S($C_1$-$C_4$-alkyl)$_2$ or —S(aryl)$_2$;

$R_{74}$ is H; —$SO_3M$; —O—$C_1$-$C_4$-alkyl; —CN; —Cl; —COO—$C_1$-$C_4$-alkyl; or —CON($C_1$-$C_4$-alkyl)$_2$;

$R_{75}$ is H; $C_1$-$C_4$-alkyl; —Cl or —$SO_3M$;

$R_{76}$ and $R_{77}$, independently of one another, are H; $C_1$-$C_4$-alkyl; —$SO_3M$; —Cl or —O—$C_1$-$C_4$-alkyl;

$R_{78}$ is H or $C_1$-$C_4$-alkyl;

$R_{79}$ is H; $C_1$-$C_4$-alkyl; —CN; —Cl; —COO—$C_1$-$C_4$-alkyl; —CON($C_1$-$C_4$-alkyl)$_2$; aryl or —O-aryl; and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups and n is 0 or 1.

In the compounds of formulae (33) to (40), $C_1$-$C_4$-alkyl groups are, e.g., methyl, ethyl, n-propyl, isopropyl and n-butyl, especially methyl. Aryl groups are naphthyl or, especially, phenyl.

Specific examples of preferred compounds of formula (33) are those having the formulae:

(41)

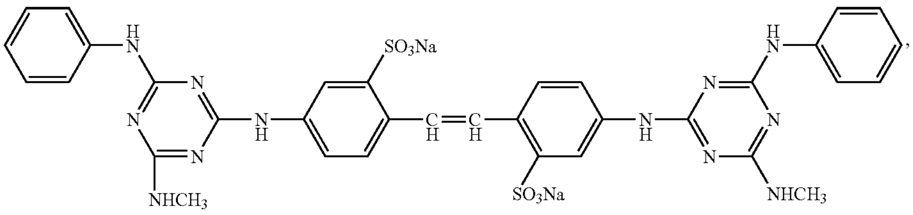

-continued
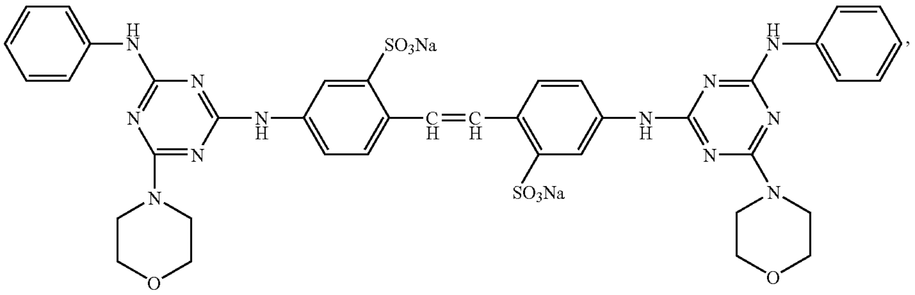
(42)
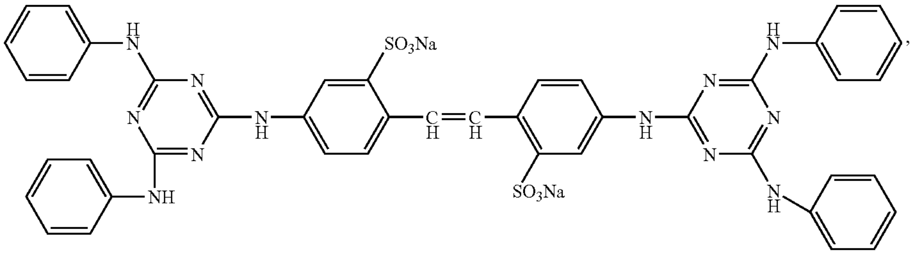
(43)
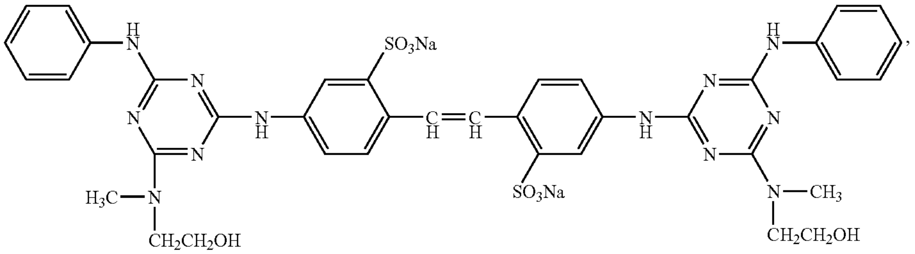
(44)
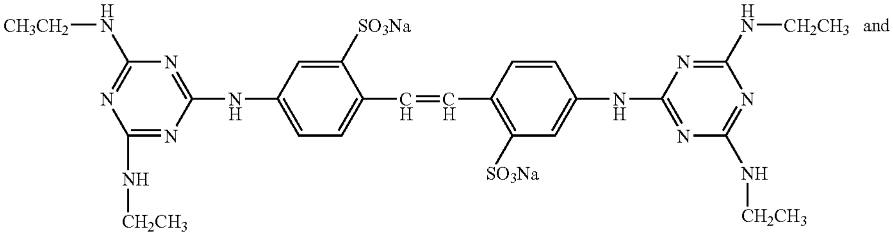
(45)
and
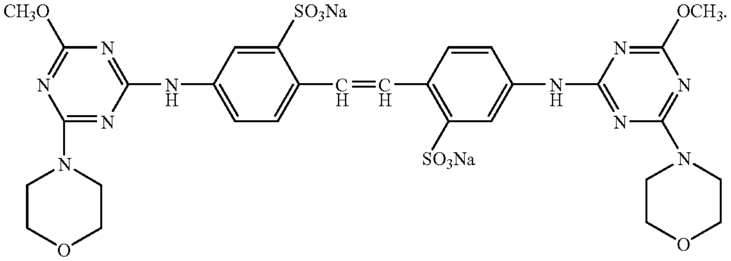
(46)

Specific preferred examples of compounds of formula (34) are those of formulae:
(47)
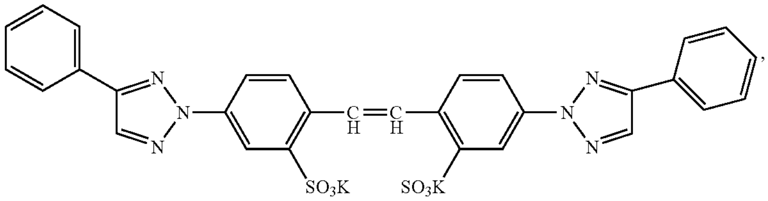
,
(48)
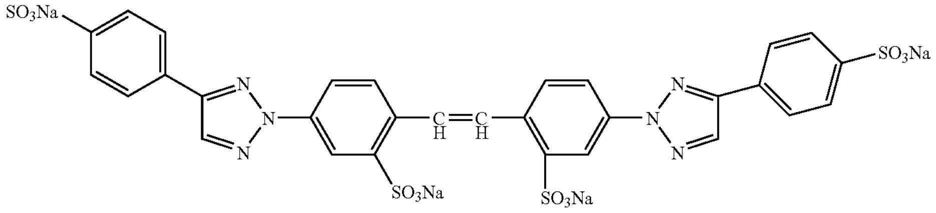
and
(49)
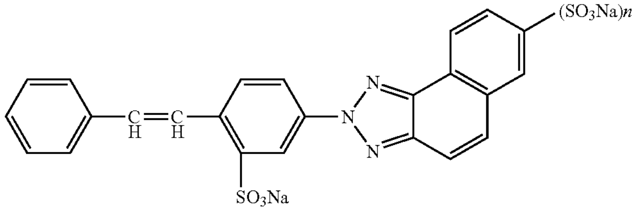
in which n has its previous significance.
Preferred examples of compounds of formula (36) are those having the formulae:
(50)
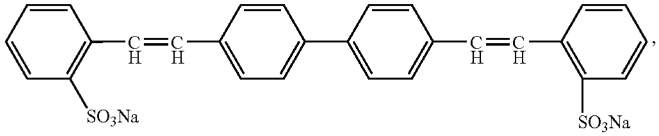
,
(51)
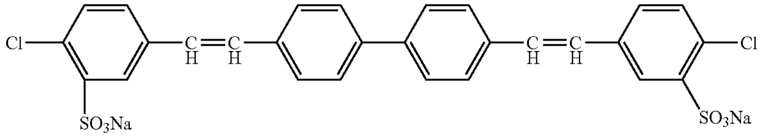
and
(52)
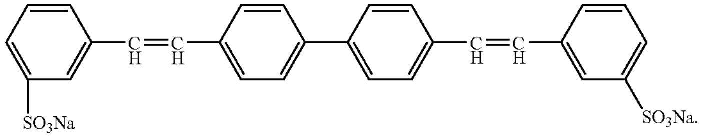
.
Preferred examples of compounds of formula (37) are those of formulae:
(53)
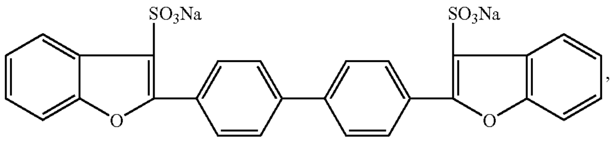
, -continued (54)

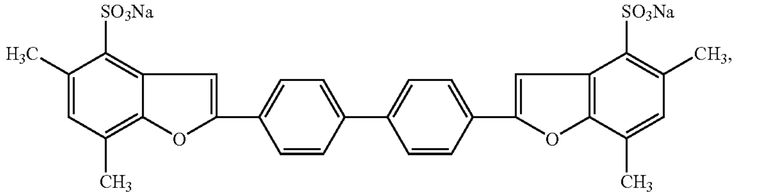

(55)

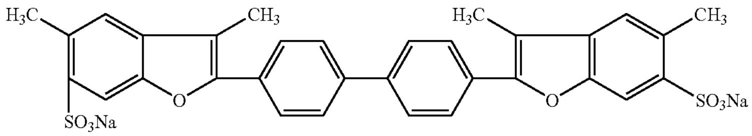

and (56)

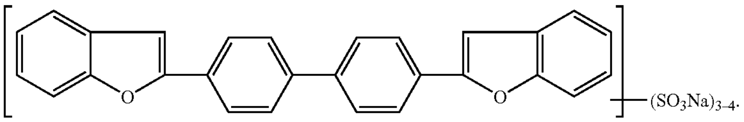

A preferred example of a compound of formula (40) is that having the formula (57):

(57)

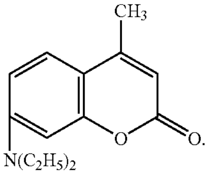

The compounds of formulae (23) to (57) are known and may be obtained by known methods.

Further preferred FWA's are those of the class of cationic bistyrylphenyl fluorescent whitening agent having the formula (58):

(58)

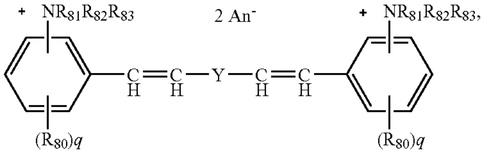

in which

Y is arylene, preferably 1,4-phenylene or 4,4'-diphenylene, each optionally substituted by chloro, methyl or Methoxy, q is 1 or 2, $R_{80}$ is hydrogen; chloro; $C_1$-$C_4$-alkyl; $C_1$-$C_4$-alkoxy; cyano or $C_1$-$C_4$-alkoxycarbonyl, $R_{81}$ and $R_{82}$ are C-$C_4$-alkyl; chloroethyl; methoxyethyl; β-ethoxyethyl; β-acetoxyethyl or β-cyanoethyl; benzyl or phenylethyl, $R_{83}$ is $C_1$-$C_4$-alkyl; $C_2$-$C_3$-hydroxyalkyl; β-hydroxy-γ-chloropropyl; β-cyanoethyl or $C_1$-$C_4$-alkoxy-carbonylethyl, and $An^{(-)}$ has its previous significance and is preferably the chloride; bromide; iodide; methosulfate; ethosulfate; benzenesulfonate or p-toluenesulfonate anion when $R_{83}$ is $C_1$-$C_4$-alkyl or $An^{(-)}$ is preferably the formate; acetate; propionate or benzoate anion when $R_{83}$ is β-hydroxy-γ-chloropropyl; β-cyanoethyl or $C_1$-$C_4$-alkoxy-carbonylethyl.

Preferred compounds of formula (58) are those in which Y is 1,4-phenylene or 4,4'-diphenylene; $R_{80}$ is hydrogen; methyl or cyano; $R_{81}$ and $R_{82}$ are each methyl or cyano; and $R_{83}$ and $An^{(-)}$ have their previously indicated preferred meanings.

One particularly preferred compound of formula (58) is that having the formula (59):

(59)

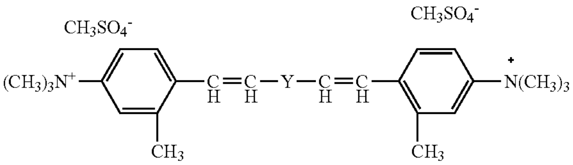

The compounds of formula (58) and their production are described in U.S. Pat. No. 4,009,193.

A further preferred class of cationic bistyrylphenyl fluorescent whitening agent is that having the formula (60):

(60)

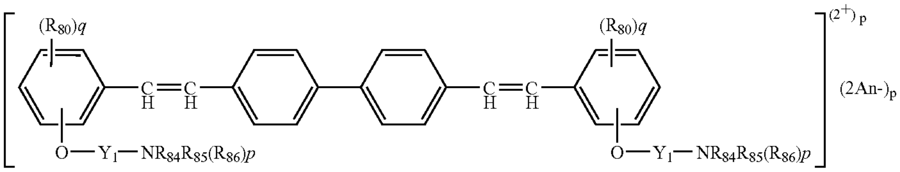

in which q is 1 or 2, $R_{80}$ is hydrogen; chloro; $C_1$-$C_4$-alkyl; $C_1$-$C_4$-alkoxy; cyano or $C_1$-$C_4$-alkoxycarbonyl, $Y_1$ is $C_2$-$C_4$-alkylene or hydroxypropylene;

$R_{84}$ is $C_1$-$C_4$-alkyl or, together with $R_{85}$ and the nitrogen to which they are each attached, $R_{84}$ forms a pyrrolidine; piperidine; hexamethyleneimine or morpholine ring;

$R_{85}$ is $C_1$-$C_4$-alkyl or, together with $R_{84}$ and the nitrogen to which they are each attached, $R_{85}$ forms a pyrrolidine, piperidine, hexamethyleneimine or morpholine ring;

$R_{86}$ is hydrogen; $C_1$-$C_4$-alkyl; $C_3$-$C_4$-alkenyl; $C_1$-$C_4$-alkoxycarbonylmethyl; benzyl; $C_2$-$C_4$-hydroxyalkyl; $C_2$-$C_4$-cyanoalkyl or, together with $R_{84}$ and $R_{85}$ and the nitrogen atom to which they are each attached, $R_{86}$ forms a pyrrolidine, piperidine, hexamethyleneimine or morpholine ring;

$An^{(-)}$ is an anion of an organic or inorganic acid, in particular a formate, acetate, propionate, glycolate, lactate, acrylate, methanephosphonate, phosphite, sulfonate, dimethyl or diethyl phosphite anion , or a mixture thereof, and p is 0 or 1.

Preferred compounds of formula (60) are those in which q is 1; $R_{80}$ is hydrogen, chlorine, $C_1$-$C_4$-alkyl or $C_1$-$C_4$-alkoxy; $Y_1$ is $(CH_2)_2$; $R_{84}$ and $R_{85}$ are the same and each is methyl or ethyl; $R_{86}$ is methyl or ethyl; p is 1; and $An^{(-)}$ is $CH_3OSO_3$ or $C_2H_5OSO_3$.

The compounds of formula (60) and their production are described in U.S. Pat. No. 4,339,393.

A further preferred class of cationic bistyrylphenyl fluorescent whitening agent is that having the formula (61):

(61)

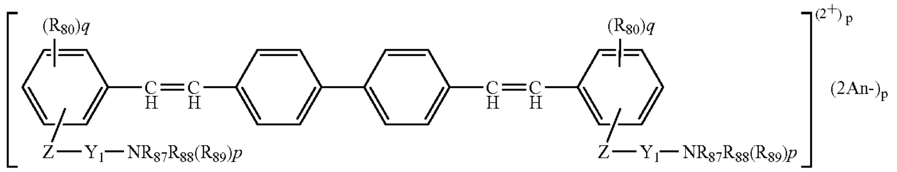

in which $R_{80}$, $Y_1$, $An^{(-)}$, p and q have their previous significance, $R_{87}$ and $R_{88}$, independently of one another, are $C_1$-$C_4$-alkyl or $C_2$-$C_3$-alkenyl or $R_{87}$ and $R_{88}$, together with the nitrogen atom to which they are attached, form a pyrrolidine; piperidine; hexamethyleneimine or morpholine ring $R_{89}$ is hydrogen; $C_1$-$C_4$-alkyl or $C_2$-$C_3$-alkenyl or $R_{87}$, $R_{88}$ and $R_{89}$, together with the nitrogen atom to which they are attached, form a pyridine or picoline ring; and Z is sulfur, —$SO_2$—; —$SO_2NH$—; —O—$C_1$-$C_4$-alkylene-COO— or —OCO—.

Preferred compounds of formula (61) are those in which $R_{80}$ is hydrogen; chloro; $C_1$-$C_4$-alkyl or $C_1$-$C_4$-alkoxy; $R_{87}$ and $R_{88}$, independently of one another, are $C_1$-$C_4$-alkyl or, together with the nitrogen atom to which they are attached, form a pyrrolidine, piperidine or morpholine ring; $R_{89}$ is hydrogen; $C_1$-$C_4$-alkyl or $C_3$-$C_4$-alkenyl or $R_{87}$, $R_{88}$ and $R_{89}$, together with the nitrogen atom to which they are attached, form a pyridine ring; and Z is sulfur, —$SO_2$— or —$SO_2NH$—.

The compounds of formula (61) and their production are described in U.S. Pat. No. 4,486,352.

A further preferred class of cationic bistyrylphenyl fluorescent whitening agent is that having the formula (62):

(62)

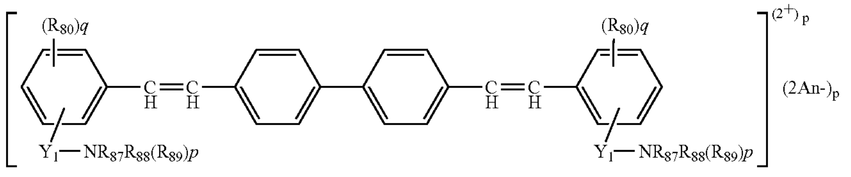

in which $R_{80}$, $R_{87}$, $R_{88}$, $R_{89}$, $Y_1$, An(−), p and q have their previous significance.

Preferred compounds of formula (62) are those in which q is 1; $R_{80}$ is hydrogen; chloro; $C_1$-$C_4$-alkyl or $C_1$-$C_4$-alkoxy; $R_{87}$ and $R_{88}$, independently of one another, are $C_1$-$C_4$-alkyl or $R_{87}$ and $R_{88}$ together with the nitrogen atom to which they are attached, form a pyrrolidine; piperidine or morpholine ring; $R_{89}$ is hydrogen; $C_1$-$C_4$-alkyl or $C_3$-$C_4$-alkenyl or $R_{87}$, $R_{88}$ and $R_{89}$, together with the nitrogen atom to which they are attached, form a pyridine ring.

The compounds of formula (62) and their production are described in U.S. Pat. No. 4,602,087.

One preferred class of amphoteric styrene fluorescent whitening agent is that having the formula (63):

(63)

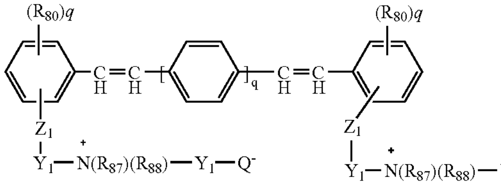

in which $R_{80}$, $R_{87}$, $R_{88}$, $Y_1$ and q have their previous significance and $Z_1$ is oxygen; sulfur; a direct bond; —COO—; —CON($R_{90}$)— or —$SO_2N(R_{90})$— in which $R_{90}$ is hydrogen; $C_1$-$C_4$-alkyl or cyanoethyl; and Q is —COO— or —$SO_3$.

Preferred compounds of formula (63) are those in which $Z_1$ is oxygen; a direct bond; —CONH—; —$SO_2NH$— or —COO—; especially oxygen; q is 1; $R_{80}$ is hydrogen; $C_1$-$C_4$-alkyl; methoxy or chlorine; and $R_{87}$, $R_{88}$, $Y_1$ and Q have their previous significance.

The compounds of formula (63) and their production are described in U.S. Pat. No. 4,478,598.

One preferred class of amine oxide fluorescent whitening agent is that having the formula:

(64)

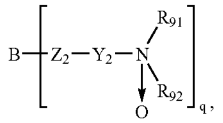

in which q has its previous significance;

B is a brightener radical selected from a 4,4'-distyrylbiphenyl; 4,4'-divinyl-stilbene, and a 1,4'-distyrylbenzene, each optionally substituted by one to four substituents selected from halogen, $C_1$-$C_4$-alkyl, $C_1$-$C_4$-hydroxyalkyl, $C_1$-$C_4$-halogenoalkyl, $C_1$-$C_4$-cyanoalkyl, $C_1$-$C_4$-alkoxy-$C_1$-$C_4$-alkyl, phenyl-$C_1$-$C_4$-alkyl, carboxy-$C_1$-$C_4$-alkyl, carb-$C_1$-$C_4$-alkoxy-$C_1$-$C_4$-alkyl, $C_1$-$C_4$-alkenyl, $C_5$-$C_8$-cycloalkyl, $C_1$-$C_4$-alkoxy, $C_1$-$C_4$-alkenoxy, $C_1$-$C_4$-alkoxycarbonyl, carbamoyl, cyano, $C_1$-$C_4$-alkyl-sulfonyl, phenylsulfonyl, $C_1$-$C_4$-alkoxysulfonyl, sulfamoyl, hydroxyl, carboxyl, sulfo and trifluoromethyl;

$Z_2$ is a direct bond between B and $Y_2$; an oxygen atom; a sulfur atom; —$SO_2$—; —$SO_2$—O—; —COO—; —CON($R_{93}$)— or —$SO_2N(R_{93})$— in which $R_{93}$ is hydrogen or $C_1$-$C_4$-alkyl optionally substituted by halogen, cyano, hydroxyl, $C_2$-$C_5$-carbalkoxy, $C_1$-$C_4$-alkoxy, phenyl, chlorophenyl, methylphenyl, methoxyphenyl, carbamoyl or sulfamoyl;

$Y_2$ is $C_2$-$C_4$-alkylene or $C_2$-$C_4$-alkyleneoxy-$C_2$-$C_4$-alkylene, each optionally substituted by halogen, hydroxyl, $C_2$-$C_5$carbalkoxy, $C_1$-$C_4$-alkoxy, phenyl, chlorophenyl, methylphenyl, methoxyphenyl, carbamoyl or sulfamoyl; and $R_{91}$ and $R_{92}$, independently of one another, are $C_5$-$C_8$-cycloalkyl; $C_1$-$C_4$-alkyl or phenyl, each optionally substituted by halogen, hydroxyl, $C_2$-$C_5$-carbalkoxy, $C_1$-$C_4$-alkoxy, phenyl, chlorophenyl, methylphenyl, methoxyphenyl, carbamoyl or sulfamoyl; in which, in all the carbamoyl or sulfamoyl groups, the nitrogen atom is optionally substituted by one or two $C_1$-$C_4$-alkyl, $C_1$-$C_4$-hydroxyalkyl, $C_2$-$C_5$-cyanoalkyl, $C_1$-$C_4$-halogenoalkyl, benzyl or phenyl groups.

Preferred brightener radicals B are those having the formula:

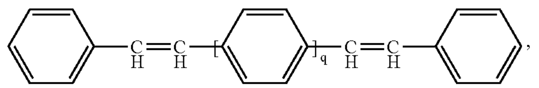

in which q has its previous significance and the rings are optionally substituted as indicated above.

Preferably $Z_2$ is oxygen; —$SO_2$— or —$SO_2N(R_{94})$— in which $R_{94}$ is hydrogen or $C_1$-$C_4$-alkyl optionally substituted by hydroxyl, halogen or cyano; and $R_{91}$ and $R_{92}$, independently of one another, are $C_1$-$C_4$-alkyl optionally substituted by halogen, cyano, hydroxyl, $C_1$-$C_4$-alkoxy, phenyl, chlorophenyl, methylphenyl, methoxyphenyl or $C_2$-$C_5$-alkoxycarbonyl. Other preferred compounds of formula (62) are those in which $Z_2$ is oxygen; sulfur, —$SO_2$—; —CON($R_{94}$)— or —$SO_2N(R_{94})$— in which $R_{94}$ is hydrogen or $C_1$-$C_4$-alkyl optionally substituted by hydroxyl, halogen or cyano; and $Y_2$ is $C_1$-$C_4$-alkylene.

The compounds of formula (64) and their production are described in U.S. Pat. No. 4,539,161.

One preferred class of cationic phosphinic acid salt fluorescent whitening agent is that having the formula (65):

(65)

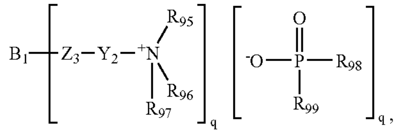

in which q and $Y_2$ have their previous significance, $B_1$ is brightener radical, $Z_3$ is a direct bond; —$SO_2$—$C_2$-$C_4$-alkyleneoxy; —$SO_2$—$C_2$-$C_4$-alkylene—COO—; —$SO_2$—; —COO—; —$SO_2$—$C_2$-$C_4$-alkylene-CON($R_{,100}$)— or —$SO_2N(R_{100})$— in which $R_{100}$ is hydrogen or $C_1$-$C_4$-alkyl optionally substituted by hydroxyl, halogen or cyano;

$R_{95}$ is $C_1$-$C_4$-alkyl or $C_2$-$C_4$-alkenyl, each optionally substituted by halogen, cyano, hydroxy, $C_1$-$C_4$-alkoxycarbonyl or $C_1$-$C_4$-alkylcarbonyloxy, or $R_{95}$ is benzyl, optionally substituted by halogen, $C_1$-$C_4$-alkyl or $C_1$-$C_4$-alkoxy, or $R_{95}$, together with $R_{96}$ or $Z_3$, forms a pyrrolidine, piperidine or morpholine radical, $R_{96}$ is $C_1$-$C_4$-alkyl or $C_2$-$C_4$-alkenyl, each optionally substituted by halogen, cyano, hydroxy, $C_1$-$C_4$-alkoxycarbonyl or $C_1$-$C_4$-alkylcarbonyloxy, or $R_{96}$ is benzyl, optionally substituted by halogen, $C_1$-$C_4$-alkyl or $C_1$-$C_4$-alkoxy, or $R_{96}$, together with $R_{95}$, forms a pyrrolidine, piperidine or morpholine radical, $R_{97}$ is $C_1$-$C_4$-alkyl, $R_{98}$ is hydrogen or $C_1$-$C_4$-alkyl, optionally substituted by cyano, hydroxy, $C_1$-$C_4$-alkoxycarbonyl or $C_1$-$C_4$-alkylcarbonyloxy, and $R_{99}$ is $C_1$-$C_4$-alkyl.

Preferably, brightener radical $B_1$ has the formula:

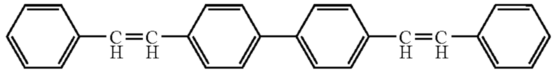

or the formula:

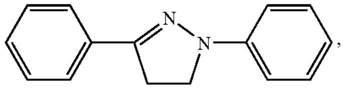

each optionally substituted by one to four substituents selected from halogen, $C_1$-$C_4$-alkyl, $C_1$-$C_4$-hydroxyalkyl, $C_1$-$C_4$-halogenoalkyl, $C_1$-$C_4$-cyanoalkyl, $C_1$-$C_4$-alkoxy-$C_1$-$C_4$-alkyl, phenyl-$C_1$-$C_4$-alkyl, carboxy-$C_1$-$C_4$-alkyl, carb-$C_1$-$C_4$-alkoxy-$C_1$-$C_4$-alkyl, $C_1$-$C_4$-alkenyl, $C_5$-$C_8$-cycloalkyl, $C_1$-$C_4$-alkoxy, $C_1$-$C_4$-alkenoxy, $C_1$-$C_4$-alkoxycarbonyl, carbamoyl, cyano, $C_1$-$C_4$-alkyl-sulfonyl, phenylsulfonyl, $C_1$-$C_4$-alkoxysulfonyl, sulfamoyl, hydroxyl, carboxyl, sulfo and trifluoromethyl.

The compounds of formula (65) and their production are described in GB-A-2 023 605.

Preferred bis(triazinyl)diaminostilbene anionic fluorescent whitening agents for use in the present invention are those having the formula (66):

(62)

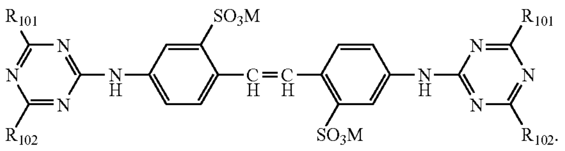

Preferred dibenzofuranylbiphenyl anionic fluorescent whitening agents for use in the present invention are those having the formula (67):

(67)

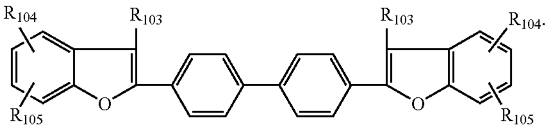

Preferred anionic bistyrylphenyl fluorescent whitening agents for use in the present invention are those having the formula (68):

(68)

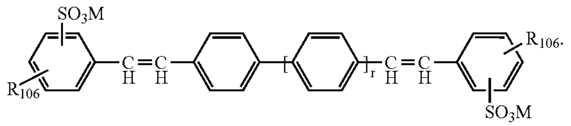

In the formulae (66) to (68), $R_{101}$ is phenyl, optionally substituted by one or two —$SO_3M$ groups, $R_{102}$ is —NH—$C_1$-$C_4$-alkyl; —N($C_1$-$C_4$-alkyl)$_2$; —NH—$C_1$-$C_4$-alkoxy; —N($C_1$-$C_4$-alkoxy)$_2$;

—N($C_1$-$C_4$-alkyl)($C_1$-$C_4$-hydroxyalkyl) or —N($C_1$-$C_4$-hydroxyalkyl)$_2$, $R_{103}$ is H; —$C_1$-$C_4$-alkyl; —CN; —Cl or —$SO_3M$; $R_{104}$ and $R_{105}$, independently of one another, are H;

$C_1$-$C_4$-alkyl; —$SO_3M$; —CN; —Cl or —O—$C_1$-$C_4$-alkyl, provided that at least two of $R_{103}$, $R_{104}$ and $R_{105}$ are —$SO_3M$ and the third group has solubilising character, $R_{81}$ is H; —$SO_3M$; —O—$C_1$-$C_4$-alkyl; —CN; —Cl; —COO—$C_1$-$C_4$-alkyl or —CON($C_1$-$C_4$-alkyl)$_2$, M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups and r is 0 or 1.

The compounds of formulae (66) to (68) are known and may be obtained by known methods.

Especially preferred are the non-ionic or the anionic FWA's.

The granulates in the formulations according to the invention may contain from 0 to 15 wt-% water (component c), based on the total weight of the granulate.

The granulates in the formulations according to the invention preferably have an average particle size of <500 μm. Greater preference is given to the particle size of the granulates being from 40 to 400 μm.

A preferred embodiment of the present invention relates to granulates comprising a) from 2 to 75 wt-% of at least one composition comprising at least one phthalocyanine compound of formula (1a), (1b), (2a), (3), (4), (4a), (5), (6) and/or (7), and at least one azo dyestuff of formulae

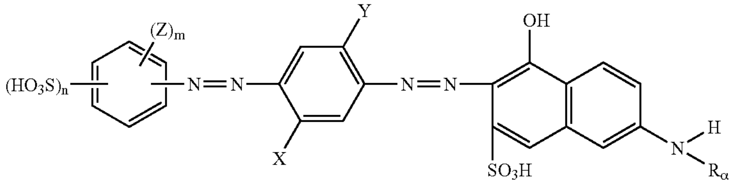

or

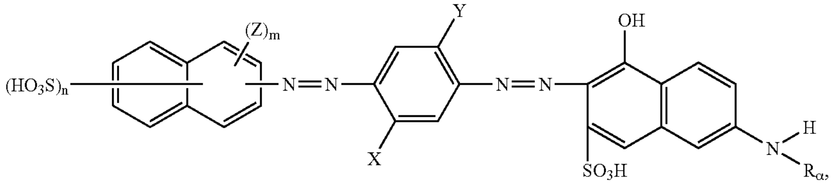

wherein

X and Y, independently of one another, are each hydrogen;

$C_1$-$C_4$-alkyl or $C_1$-$C_4$-alkoxy, $R_\alpha$ is hydrogen or aryl,

Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff of formula (D), (E), (F), (G), (H) and/or (I) as defined above, based on the total weight of the granulate, b) from 10 to 95 wt-% of at least one further additive selcted from the group consisting of anionic or non-ionic dispersing agents; water-soluble organic polymers; inorganic salt; low-molecular-weight organic acid or a salt thereof; wetting agents; disintegrants such as, for example, powdered or fibrous cellulose, microcrystalline cellulose; fillers such as, for example, dextrin; water-insoluble or water-soluble dyes or pigments; dissolution accelerators; optical brighteners; aluminium silicates; talc, kaolin, $TiO_2$, $SiO_2$ and magnesium trisilicate, and A further embodiment is a liquid formulation comprising a composition comprising at least one photocatalyst and at least one azo dyestuff and/or at least one triphenylmethane dyestuff.

Preferably a liquid formulation comprising (a) 0.01-95 wt-%, preferably 1-80 wt-%, more preferably 5-70 wt-% of a composition comprising at least one water-soluble phthalocyanine compound and at least one azo dyestuff and/or at least one triphenylmethane dyestuff as defined above, based on the total weight of the liquid formulation, (b) 5-99.99 wt-%, preferably 20-99 wt-%, more preferably 30-95 wt-%, based on the total weight of the liquid formulation, of at least one organic solvent and (c) 0-10 wt-%, preferably 0-5 wt-%, more preferably 0-2 wt-%, based on the total weight of the liquid formulation, of at least one further additive.

More preferably a liquid formulation comprising (a) 0.01-95 wt-%, preferably 1-80 wt-%, more preferably 5-70 wt-% of a composition comprising at least one water-soluble phthalocyanine compound and at least one azo dyestuff formulae

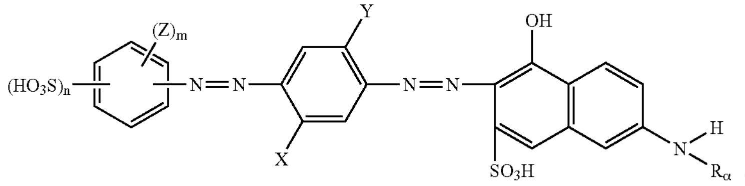

or

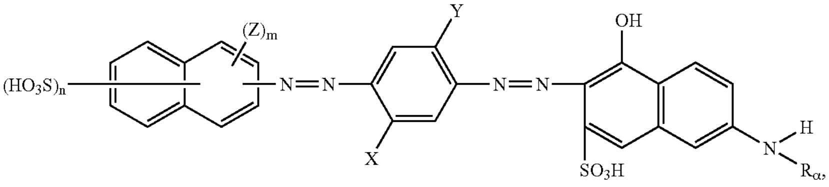

c) from 0 to 15 wt-% water, based on the total weight of the granulate.

A more preferred embodiment of the present invention relates to granulates comprising a) from 2 to 75 wt-% of at least one composition comprising at least one phthalocyanine compound of formula (1a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I) as defined above, based on the total weight of the granulate, b) from 10 to 95 wt-% of at least one further additive selcted from the group consisting of anionic or non-ionic dispersing agents; water-soluble organic polymers; inorganic salt; low-molecular-weight organic acid or a salt thereof; wetting agents; disintegrants such as, for example, powdered or fibrous cellulose, microcrystalline cellulose; fillers such as, for example, dextrin; water-insoluble or water-soluble dyes or pigments; dissolution accelerators; optical brighteners; aluminium silicates; talc, kaolin, $TiO_2$, $SiO_2$ and magnesium trisilicate, and c) from 0 to 15 wt-% water, based on the total weight of the granulate.

wherein

X and Y, independently of one another, are each hydrogen;

$C_1$-$C_4$-alkyl or $C_1$-$C_4$-alkoxy, $R_\alpha$ is hydrogen or aryl,

Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff as defined above, based on the total weight of the liquid formulation, (b) 5-99.99 wt-%, preferably 20-99 wt-%, more preferably 30-95 wt-%, based on the total weight of the liquid formulation, of at least one organic solvent and (c) 0-10 wt-%, preferably 0-5 wt-%, more preferably 0-2 wt-%, based on the total weight of the liquid formulation, of at least one further additive.

Especially preferred is a liquid formulation comprising (a) 0.01-95 wt-%, preferably 1 -80 wt-%, more preferably 5-70 wt-% of at least one composition comprising at least one phthalocyanine compound of formula (1a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I) as defined above, based on the total weight of the liquid formulation, (b) 5-99.99 wt-%, preferably 20-99 wt-%, more preferably 30-95 wt-%, based on the total weight of the liquid formulation, of at least one organic solvent and (c) 0-10 wt-%, preferably 0-5 wt-%, more preferably 0-2 wt-%, based on the total weight of the liquid formulation, of at least one further additive.

The preferences for the phthalocyanines, for the azo and triphenylmethane dyestuffs as defined above also apply for the liquid formulation.

As organic solvents, polar solvents are preferred. Especially preferred are $C_1$-$C_4$-alcohols or water.

If appropriate, the liquid formulation according to the invention can further comprise optional additives; examples are preservatives or mixtures of preservatives, such as chloroacetamide, triazine derivates, benzoisothiazolines, 2-methyl-2H-isothiazol-3on, 2-octyl-2H-isothiazol-3on, 2-brom-2-nitropropan-1,3-diol or aqueous formaldehyde solution; Mg/Al silicates or mixtures of Mg/Al silicates, such as bentonite, montmorillonite, zeolites or highly disperse silicic acids; odour improvers and perfuming agent or mixtures thereof, antifoam agents or mixtures thereof; builders or mixtures thereof; protective colloids or mixtures thereof; stabilizers or mixtures thereof; sequestering agents and antifreeze agents or mixtures thereof, such as propylene glycol.

A preferred embodiment of the present invention related to a liquid formulation comprising (a) 0.01-95 wt-%, preferably 1-80 wt-%, more preferably 5-70 wt-% of at least one t composition comprising
at least one phthalocyanine compound of formula (1a), (1b), (2a), (3), (4), (4a), (5), (6) and/or (7), and
at least one azo dyestuff of formulae (b) 5-99.99 wt-%, preferably 20-99 wt-%, more preferably 30-95 wt-%, based on the total weight of the liquid formulation, of $C_1$-$C_4$-alcohols or water and (c) 0-10 wt-%, preferably 0-5 wt-%, more preferably 0-2 wt-%, based on the total weight of the liquid formulation, of at least one additive selected from the group consisting of preservatives; Mg/Al silicates; odour improvers; perfuming agent; antifoam agents; builders; protective colloids; stabilizers; sequestering agents and antifreeze agents.

A more preferred embodiment of the present invention related to a liquid formulation comprising (a) 0.01-95 wt-%, preferably 1-80 wt-%, more preferably 5-70 wt-% of at least one t composition comprising
at least one phthalocyanine compound of formula (1a), (1b), (2a), (3), (4), (4a), (5), (6) and/or (7), and
at least one azo dyestuff of formula (A), (B), and/or (C) and/or
at least one triphenylmethane dyestuff of formula (D), (E), (F), (G), (H) and/or (I) as defined above, based on the total weight of the liquid formulation, (b) 5-99.99 wt-%, preferably 20-99 wt-%, more preferably 30-95 wt-%, based on the total weight of the liquid formulation, of $C_1$-$C_4$-alcohols or water and (c) 0-10 wt-%, preferably 0-5 wt-%, more preferably 0-2 wt-%, based on the total weight of the liquid formulation, of at least one additive selected from the group consisting of preservatives; Mg/Al silicates; odour improvers; perfuming agent; antifoam agents; builders; protective colloids; stabilizers; sequestering agents and antifreeze agents.

The composition according to the invention is used especially in a washing or softener formulation. Such a washing or softener formulation may be in solid, liquid, gel-like or paste-

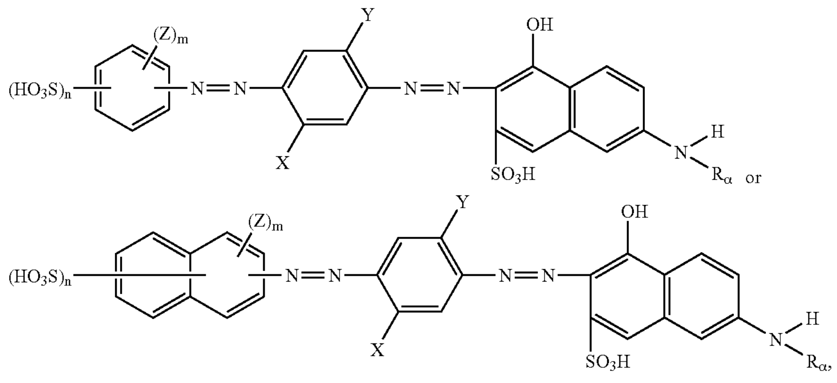

wherein

X and Y, independently of one another, are each hydrogen; $C_1$-$C_4$-alkyl or $C_1$-$C_4$-alkoxy, $R_\alpha$ is hydrogen or aryl, Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff of formula (D), (E), (F), (G), (H) and/or (I) as defined above, based on the total weight of the liquid formulation, like form, for example in the form of a liquid, non-aqueous washing agent composition containing not more than 5 wt-%, preferably from 0 to 1 wt-%, water and based on a suspension of a builder substance in a non-ionic surfactant, for example as described in GB-A-2 158 454.

The washing formulations may also be in the form of powders or (super-)compact powders, in the form of single- or multi-layer tablets (tabs), in the form of washing agent bars, washing agent blocks, washing agent sheets, washing agent pastes or washing agent gels, or in the form of powders, pastes, gels or liquids used in capsules or in pouches (sachets).

However, the washing agent compositions are preferably in the form of non-aqueous formulations, powders, tabs or granules.

The present invention accordingly relates also to washing agent formulations containing I) from 5 to 70 wt-% A) of at least one anionic surfactant and/or B) at least one non-ionic surfactant, based on the total weight of the washing agent formulation, II) from 5 to 60 wt-% C) of at least one builder substance, based on the total weight of the washing agent formulation, III) from 0 to 30 wt-% D) of at least one peroxide and, optionally, at least one activator, based on the total weight of the washing agent formulation, and IV) from 0.001 to 1 wt-% E) of at least one granulate which contains
  - a) from 2 to 75 wt-% of at least one water-soluble phthalocyanine compound and at least one azo dyestuff and/or at least one triphenylmethane dyestuff as defined above, based on the total weight of the granulate,
  - b) from 10 to 95 wt-% of at least one further additive, based on the total weight of the granulate, and
  - c) from 0 to 15 wt-% water, based on the total weight of the granulate, and V) from 0 to 60 wt-% F) of at least one further additive, and VI) from 0 to 5 wt-% G) water.

The sum of the wt-% of components I)-VI) in a formulation is always 100%.

All the preferences mentioned hereinbefore apply to the granulate E).

The present invention accordingly relates also to washing agent formulations containing I) from 5 to 70 wt-% A) of at least one anionic surfactant and/or B) at least one non-ionic surfactant, based on the total weight of the washing agent formulation, II) from 5 to 60 wt-% C) of at least one builder substance, based on the total weight of the washing agent formulation, III) from 0 to 30 wt-% D) of at least one peroxide and, optionally, at least one activator, based on the total weight of the washing agent formulation, and IV) from 0.001 to 1 wt-% E) of at least one granulate which contains
  - a) from 2 to 75 wt-% of at least one water-soluble phthalocyanine compound and at least one azo dyestuff of formulae

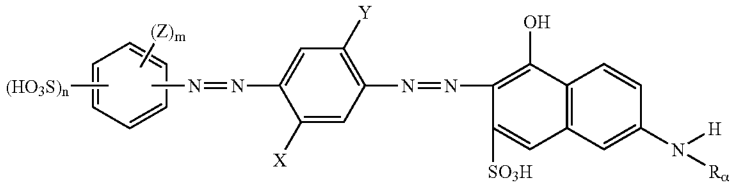

or

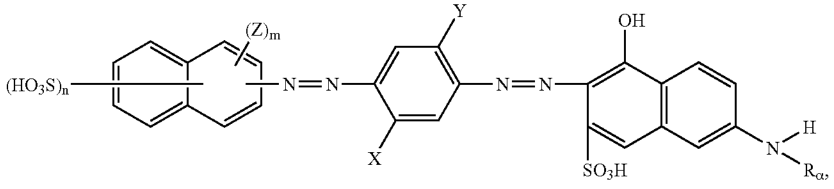

wherein

X and Y, independently of one another, are each hydrogen;

$C_1$-$C_4$-alkyl or $C_1$-$C_4$-alkoxy, $R_\alpha$ is hydrogen or aryl,

Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff as defined above, based on the total weight of the granulate,
  - b) from 10 to 95 wt-% of at least one further additive, based on the total weight of the granulate, and
  - c) from 0 to 15 wt-% water, based on the total weight of the granulate, and V) from 0 to 60 wt-% F) of at least one further additive, and VI) from 0 to 5 wt-% G)water.

The percentages of components I) to VI) in the washing agent formulations herein below are in all cases based on the total weight of the washing agent formulation.

The anionic surfactant A) can be, for example, a sulfate, sulfonate or carboxylate surfactant or a mixture thereof. Preferred sulfates are those having from 12 to 22 carbon atoms in the alkyl radical, optionally in combination with alkyl ethoxysulfates in which the alkyl radical has from 10 to 20 carbon atoms.

Preferred sulfonates are e.g. alkylbenzenesulfonates having from 9 to 15 carbon atoms in the alkyl radical. The cation in the case of anionic surfactants is preferably an alkali metal cation, especially sodium.

The anionic surfactant component may be, e.g., an alkylbenzenesulfonate, an alkylsulfate, an alkylethersulfate, an olefinsulfonate, an alkanesulfonate, a fatty acid salt, an alkyl or alkenyl ether carboxylate or an a-sulfofatty acid salt or an ester thereof. Preferred are alkylbenzenesulfonates having 10 to 20 carbon atoms in the alkyl group, alkylsulfates having 8 to 18 carbon atoms, alkylethersulfates having 8 to 22 carbon atoms, and fatty acid salts being derived from palm oil or tallow and having 8 to 22 carbon atoms. The average molar number of ethylene oxide added in the alkylethersulfate is preferably 1 to 22, preferably 1 to 10. The salts are preferably derived from an alkaline metal like sodium and potassium, especially sodium. Highly preferred carboxylates are alkali metal sarcosinates of formula $R—CO(R_1)CH_2COOM_1$ in which R is alkyl or alkenyl having 8-20 carbon atoms in the alkyl or alkenyl radical, $R_1$ is $C_1$-$C_4$ alkyl and $M_1$ is an alkali metal, especially sodium.

The nonionic surfactant component may be, e.g., primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

The total amount of anionic surfactant and nonionic surfactant is preferably 5-50 wt-%, preferably 5-40 wt-% and more preferably 5-30 wt-%. As to these surfactants it is preferred that the lower limit is 10 wt-%.

Preferred carboxylates are alkali metal sarcosinates of formula $R_{19}$—CO—N($R_{20}$)—$CH_2COOM'^1$ wherein $R_{19}$ is alkyl or alkenyl having from 8 to 20 carbon atoms in the alkyl or alkenyl radical, $R_{20}$ is $C_1$-$C_4$alkyl and $M'^1$ is an alkali metal.

The non-ionic surfactant B) can be, for example, a condensation product of from 3 to 8 mol of ethylene oxide with 1 mol of a primary alcohol having from 9 to 15 carbon atoms.

As builder substance C) there come into consideration, for example, alkali metal phosphates, especially tripolyphosphates, carbonates or hydrogen carbonates, especially their sodium salts, silicates, aluminosilicates, polycarboxylates, polycarboxylic acids, organic phosphonates, aminoalkylenepoly(alkylenephosphonates) or mixtures of those compounds.

Especially suitable silicates are sodium salts of crystalline layered silicates of the formula $NaHSi_tO_{2t+1}.pH_2O$ or $Na_2Si_tO_{2t+1}.pH_2O$ wherein t is a number from 1.9 to 4 and p is a number from 0 to 20.

Among the aluminosilicates, preference is given to those commercially available under the names zeolithe A, B, X and HS, and also to mixtures comprising two or more of those components. Zeolithe A is preferred.

Among the polycarboxylates, preference is given to polyhydroxycarboxylates, especially citrates, and acrylates and also copolymers thereof with maleic anhydride. Preferred polycarboxylic acids are nitrilotriacetic acid, ethylenediaminetetraacetic acid and ethylenediamine disuccinate either in racemic form or in the enantiomerically pure (S,S) form.

Phosphonates or aminoalkylenepoly(alkylenephosphonates) that are especially suitable are alkali metal salts of 1-hydroxyethane-1,1-diphosphonic acid, nitrilotris(methylenephosphonic acid), ethylenediaminetetramethylenephosphonic acid, hexamethylenediamin N,N,N',N' tetrakis methanphosphonic acid and diethylenetriaminepentamethylenephosphonic acid, as well as the salts therefrom.

Suitable peroxide components include, for example, the organic and inorganic peroxides (like sodium peroxides) known in the literature and available commercially that bleach textile materials at conventional washing temperatures, for example at from 5 to 95° C.

In particular, the organic peroxides are, for example, monoperoxides or polyperoxides having alkyl chains of at least 3, preferably 6 to 20, carbon atoms; in particular diperoxydicarboxylates having 6 to 12 C atoms, such as diperoxyperacetates, diperoxypersebacates, diperoxyphthalates and/or diperoxydodecanedioates, especially their corresponding free acids, are of interest Especially preferred are mono- oder polyperoxide, especially organic peracids or their salts such as phthalimidoperoxycapronic acid, peroxybenzoic acid, diperoxydodecandiacid, diperoxynonandiacid, diperoxydecandiacid, diperoxyphthalic acid or their salts.

The amount of peroxide is preferably 0.5-30 wt-%, preferably 1-20 wt-% and more preferably 1-15 wt-%. In case a peroxide is used, the lower limit is preferably 2 wt-%, especially 5 wt-%.

Preferably, however, inorganic peroxides are used, for example persulfates, perborates, percarbonates and/or persilicates. It will be understood that mixtures of inorganic and/or organic peroxides can also be used. The peroxides may be in a variety of crystalline forms and have different water contents, and they may also be used together with other inorganic or organic compounds in order to improve their storage stability.

The peroxides are added to the agent preferably by mixing the components, for example using a screw metering system and/or a fluidised bed mixer.

The agents may comprise, in addition to the combination according to the invention, one or more optical brighteners, for example from the class bis-triazinylamino-stilbenedisulfonic acid, bis-triazolyl-stilbenedisulfonic acid, bis-styrylbiphenyl or bis-benzofuranylbiphenyl, a bis-benzoxalyl derivative, bis-benzimidazolyl derivative or coumarin derivative or a pyrazoline derivative.

The detergents used will usually contain one or more auxiliaries such as soil suspending agents, for example sodium carboxymethylcellulose; salts for adjusting the pH, for example alkali or alkaline earth metal silicates; foam regulators, for example soap; salts for adjusting the spray drying and granulating properties, for example sodium sulphate; perfumes; and also, if appropriate, antistatic and softening agents; such as smectite clays; photobleaching agents; pigments; and/or shading agents. These constituents should, of course, be stable to any bleaching system employed. Such auxiliaries can be present in an amount of, for example, 0.1 to 20 wt-%, preferably 0.5 to 10 wt-%, especially 0.5 to 5 wt-%, based on the total weight of the detergent Furthermore, the detergent can optionally contain enzymes. Enzymes can be added to detergents for stain removal. The enzymes usually improve the performance on stains that are either protein- or starch-based, such as those caused by blood, milk, grass or fruit juices. Preferred enzymes are cellulases, proteases, amylases and lipases. Preferred enzymes are cellulases and proteases, especially proteases. Cellulases are enzymes which act on cellulose and its derivatives and hydrolyze them into glucose, cellobiose, cellooligosaccharide. Cellulases remove dirt and have the effect of mitigating the roughness to the touch. Examples of enzymes to be used include, but are by no means limited to, the following:

proteases as given in U.S. Pat. No. 6,242,405, column 14, lines 21 to 32;

lipases as given in U.S. Pat. No. 6,242,405, column 14, lines 33 to 46;

amylases as given in U.S. Pat. No. 8,242,405, column 14, lines 47 to 56; and cellulases as given in U.S. Pat. No. 6,242,405, column 14, lines 57 to 64.

The enzymes can optionally be present in the detergent. When used, the enzymes are usually present in an amount of 0.01-5 wt-%, preferably 0.05-5 wt-% and more preferably 0.1-4 wt-%, based on the total weight of the detergent.

In addition to the bleach catalyst according to formula (1) it is also possible to use further transition metal salts or complexes known as bleach-activating active ingredients and/or conventional bleach activators, that is to say compounds that, under perhydrolysis conditions, yield unsubstituted or substituted perbenzo- and/or peroxo-carboxylic acids having from 1 to 10 carbon atoms, especially from 2 to 4 carbon atoms. Suitable bleach activators include the customary bleach activators, mentioned at the beginning, that carry O- and/or N-acyl groups having the indicated number of carbon atoms and/or unsubstituted or substituted benzoyl groups. Preference is given to polyacylated alkylenediamines, especially tetraacetylethylenediamine (TAED), acylated glycolurils, especially tetraacetylglycoluril (TAGU), N,N-diacetyl-N,N-dimethylurea (DDU), acylated triazine derivatives, especially 1,5-diacetyl-2,4-dioxohexahydro-1,3,5-triazine (DADHT), compounds of formula:

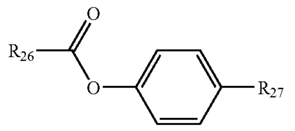

wherein $R_{26}$ is a sulfonate group, a carboxylic acid group or a carboxylate group, and wherein $R_{27}$ is linear or branched $(C_7\text{-}C_{15})$alkyl, especially activators known under the names SNOBS, SLOBS and DOBA, acylated polyhydric alcohols, especially triacetin, ethylene glycol diacetate and 2,5-diacetoxy-2,5-dihydrofuran, and also acetylated sorbitol and mannitol and acylated sugar derivatives, especially pentaacetylglucose (PAG), sucrose polyacetate (SUPA), pentaacetylfructose, tetraacetylxylose and octaacetyllactose as well as acetylated, optionally N-alkylated glucamine and gluconolactone. It is also possible to use the combinations of conventional bleach activators known from German Patent Application DE-A-44 43 177. Nitrile compounds that form perimine acids with peroxides also come into consideration as bleach activators.

Further preferred additives to the agents according to the invention are dye fixing agents and/or polymers which, during the washing of textiles, prevent staining caused by dyes in the washing liquor that have been released from the textiles under the washing conditions.

Such polymers are preferably polyvinylpyrrolidones, polyvinylimidazole or polyvinylpyridine-N-oxides which may have been modified by the incorporation of anionic or cationic substituents, especially those having a molecular weight in the range of from 5000 to 60000, more especially from 5000 to 50000. Such polymers are usually used in an amount of from 0.01 to 5 wt-%, preferably 0.05 to 5 wt-%, especially 0.1 to 2 wt-%, based on the total weight of the detergent. Preferred polymers are those given in WO-A-02/02865 (see especially page 1, last paragraph and page 2, first paragraph).

A preferred washing agent formulation according to the invention consists of

I) from 5 to 70 wt-% A) of at least one anionic surfactant from the group consisting of alkylbenzenesulfonates having from 9 to 15 carbon atoms in the alkyl radical; alkylnaphthalenesulfonates having from 6 to 16 carbon atoms in the alkyl radical in question; and alkali metal sarcosinates of the formula R—CO—N($R_1$)—$CH_2COOM_1$, wherein R is alkyl or alkenyl having from 8 to 20 carbon atoms in the alkyl or alkenyl radical, $R_1$ is $C_1$-$C_4$alkyl and $M_1$ is an alkali metal and/or B) at least one non-ionic surfactant from the group consisting of condensation products of from 3 to 8 mols of ethylene oxide with 1 mol of primary alcohol containing from 9 to 20 carbon atoms, II) from 5 to 60 wt-% C) of a builder substance from the group consisting of alkali metal phosphates; carbonates; hydrogen carbonates; silicates; aluminium silicates; polycarboxylates; polycarboxylic acids; organic phosphonates and aminoalkylenepoly (alkylenephosphonates), and III) from 0 to 30 wt-% D) of a peroxide from the group consisting of organic mono- or poly-peroxides; organic peracids and salts thereof; persulfates; perborates; percarbonates and persilicates, IV) from 0.001 to 1 wt-% E) of at least one granulate which contains a) from 2 to 70 wt-% of at least one water-soluble phthalocyanine compound and at least one azo dyestuff and/or at least one triphenylmethane dyestuff as defined above, based on the total weight of the granulate, b) from 10 to 95 wt-% of at least one further additive, based on the total weight of the granulate, and c) from 0 to 15 wt-% water, based on the total weight of the granulate, V) from 0 to 60% F) of further additives from the group consisting of optical brighteners; suspending agents for dirt; pH regulators; foam regulators; salts for regulating the spray-drying and granulating properties; fragrances; antistatic agents; fabric conditioners; enzymes; bleaching agents; pigments; toning agents; polymers which, during the washing of textiles, prevent staining caused by dyes in the washing liquor which have been released from the textiles under the washing conditions; and perborate activators, and VI) from 0 to 5% G) water.

A more preferred washing agent formulation according to the invention consists of I) from 5 to 70 wt-% A) of at least one anionic surfactant from the group consisting of alkylbenzenesulfonates having from 9 to 15 carbon atoms in the alkyl radical; alkylnaphthalenesulfonates having from 6 to 16 carbon atoms in the alkyl radical in question; and alkali metal sarcosinates of the formula R—CO—N($R_1$)—$CH_2COOM_1$, wherein R is alkyl or alkenyl having from 8 to 20 carbon atoms in the alkyl or alkenyl radical, $R_1$ is $C_1$-$C_4$alkyl and $M_1$ is an alkali metal and/or B) at least one non-ionic surfactant from the group consisting of condensation products of from 3 to 8 mols of ethylene oxide with 1 mol of primary alcohol containing from 9 to 20 carbon atoms, II) from 5 to 60 wt-% C) of a builder substance from the group consisting of alkali metal phosphates; carbonates; hydrogen carbonates; silicates; aluminium silicates; polycarboxylates; polycarboxylic acids; organic phosphonates and aminoalkylenepoly(alkylenephosphonates), and III) from 0 to 30 wt-% D) of a peroxide from the group consisting of organic mono- or poly-peroxides; organic peracids and salts thereof; persulfates; perborates; percarbonates and persilicates, IV) from 0.001 to 1 wt-% E) of at least one granulate which contains a) from 2 to 70 wt-% of at least one phthalocyanine compound of formula (1a), (1b), (2a), (3), (4), (4a), (5), (6) and/or (7), and at least one azo dyestuff of formulae

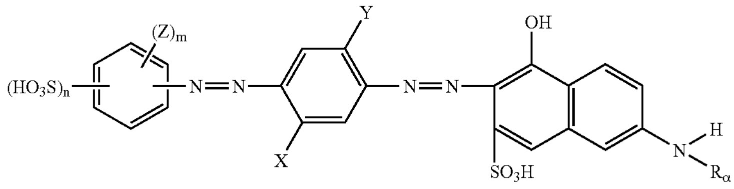

or

-continued

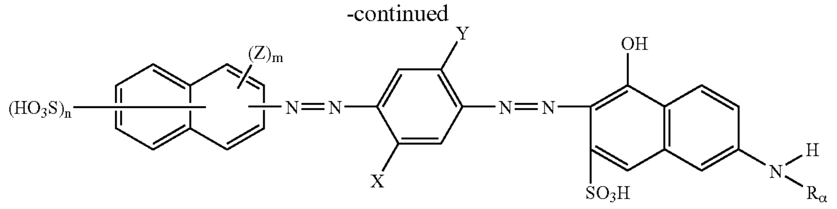

wherein

X and Y, independently of one another, are each hydrogen;

$C_1$-$C_4$-alkyl or $C_1$-$C_4$-alkoxy, $R_\alpha$ is hydrogen or aryl,

Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff of formula (D), (E), (F), (G), (H) and/or (I) as defined above, based on the total weight of the granulate, b) from 10 to 95 wt-% of at least one further additive, based on the total weight of the granulate, and c) from 0 to 15 wt-% water, based on the total weight of the granulate, V) from 0 to 60% F) of further additives from the group consisting of optical brighteners; suspending agents for dirt; pH regulators; foam regulators; salts for regulating the spray-drying and granulating properties; fragrances; antistatic agents; fabric conditioners; enzymes; bleaching agents; pigments; toning agents; polymers which, during the washing of textiles, prevent staining caused by dyes in the washing liquor which have been released from the textiles under the washing conditions; and perborate activators, and VI) from 0 to 5% G) water.

An especially preferred washing agent formulation according to the invention consists of I) from 5 to 70 wt-% A) of at least one anionic surfactant from the group consisting of alkylbenzenesulfonates having from 9 to 15 carbon atoms in the alkyl radical; alkylnaphthalenesulfonates having from 6 to 16 carbon atoms in the alkyl radical in question; and alkali metal sarcosinates of the formula R—CO—N($R_1$)—$CH_2COOM_1$, wherein R is alkyl or alkenyl having from 8 to 20 carbon atoms in the alkyl or alkenyl radical, $R_1$ is $C_1$-$C_4$alkyl and $M_1$ is an alkali metal and/or B) at least one non-ionic surfactant from the group consisting of condensation products of from 3 to 8 mols of ethylene oxide with 1 mol of primary alcohol containing from 9 to 20 carbon atoms, II) from 5 to 60 wt-% C) of a builder substance from the group consisting of alkali metal phosphates; carbonates; hydrogen carbonates; silicates; aluminium silicates; polycarboxylates; polycarboxylic acids; organic phosphonates and aminoalkylenepoly(alkylenephosphonates), and III) from 0 to 30 wt-% D) of a peroxide from the group consisting of organic mono- or poly-peroxides; organic peracids and salts thereof; persulfates; perborates; percarbonates and persilicates, IV) from 0.001 to 1 wt-% E) of at least one granulate which contains a) from 2 to 70 wt-% of at least one phthalocyanine compound of formula (1a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I) as defined above, based on the total weight of the granulate, b) from 10 to 95 wt-% of at least one further additive, based on the total weight of the granulate, and c) from 0 to 15 wt-% water, based on the total weight of the granulate, V) from 0 to 60% F) of further additives from the group consisting of optical brighteners; suspending agents for dirt; pH regulators; foam regulators; salts for regulating the spray-drying and granulating properties; fragrances; antistatic agents; fabric conditioners; enzymes; bleaching agents; pigments; toning agents; polymers which, during the washing of textiles, prevent staining caused by dyes in the washing liquor which have been released from the textiles under the washing conditions; and perborate activators, and VI) from 0 to 5% G) water.

The granulates E) are prepared according to known methods. Any known method is suitable to produce granules comprising the inventive mixture. Continuous or discontinuous methods are suitable, Continuous methods, such as spray drying or fluidised bed granulation processes are preferred.

Especially suitable are spray-drying processes in which the active ingredient solution is sprayed into a chamber with circulating hot air. The atomisation of the solution is carried out using single or binary nozzles or is brought about by the spinning effect of a rapidly rotating disc. In order to increase the particle size, the spray-drying process may be combined with additional agglomeration of the liquid particles with solid nuclei in a fluidised bed that forms an integral part of the chamber (so-called fluidised spray). The fine particles (<100 μm) obtained by a conventional spray-drying process may, if necessary after being separated from the exhaust gas flow, be fed as nuclei, without being further treated, directly into the spray cone of the atomiser of the spray-dryer, for the purpose of agglomeration with the liquid droplets of the active ingredient. During the granulation step, the water can be rapidly removed from the solutions comprising phthalocyanine compound, and, where appropriate, further additives, and it is expressly intended that agglomeration of the droplets forming in the spray cone, i.e. the agglomeration of droplets with solid particles, will take place. Preference is given to the use of agglomeration processes to produce the granulates according to the invention because such processes usually yield a higher bulk weight so that the granulates have better compatibility with washing agent formulations.

A further embodiment of the present invention comprises using, for preparation of the granulates, phthalocyanine solutions that have been purified by membrane separation procedures.

If necessary, the granules formed in the spray-dryer are removed in a continuous process, for example by a sieving operation. The fines and the oversize particles are either recycled directly to the process (without being redissolved) or are dissolved in the liquid active ingredient formulation and subsequently granulated again.

The granulates are resistant to abrasion, low in dust, free-flowing and can be readily metered. They are distinguished especially by very rapid solubility in water.

The granulates E) preferably have a density in the range from 500 to 900 g/l, dissolve rapidly in water and do not float on the surface of the washing agent solution. They may be added in the desired concentration of the phthalocyanine compound directly to the washing agent formulation.

The content of granulates E) in accordance with the invention in the formulations according to the invention is from to 0.001 to 1 wt-%, preferably from 0.001 to 0.05 wt-% and very especially from 0.005 to 0.03 wt-%.

The washing agent formulation according to the invention can be prepared in a generally known manner.

A formulation in powder form can be prepared, for example, by first preparing an initial powder by spray-drying an aqueous slurry comprising all of the afore-mentioned components except for components D) and E) and then adding the dry components D) and E) and mixing all of them together. It is also possible to start from an aqueous slurry which, although comprising components A) and C), does not comprise component B) or comprises only a portion of component B). The slurry is spray-dried; component E) is then mixed with component B) and added; and then component D) is mixed in dry. The components are preferably mixed with one another in such amounts that a solid compact washing agent composition in granule form is obtained, having a specific weight of at least 500 g/l.

In another preferred embodiment, the production of the washing agent composition is carried out in three steps. In the first step a mixture of anionic surfactant (and, where appropriate, a small amount of non-ionic surfactant) and builder substance is prepared. In the second step that mixture is sprayed with the major portion of the non-ionic surfactant and then, in the third step, peroxide and, where appropriate, catalyst, and the granulate according to the invention are added. That method is usually carried out in a fluidised bed. In a further preferred embodiment, the individual steps are not carried out completely separately, so that there is a certain amount of overlap between them. Such a method is usually carried out in an extruder, in order to obtain granulates in the form of "megapearls".

As an alternative thereto, the granulates according to the invention can, for the purpose of admixture with a washing agent in a post-dosing step, be mixed with other washing agent components such as phosphates, zeolites, brighteners or enzymes.

A mixture of that kind for post-dosing of the granulates is distinguished by a homogeneous distribution of the granulates according to the invention in the mixture and can consist of, for example, from 5 to 50% granulates and from 95 to 50% sodium tripolyphosphate. Where the dark appearance of the granulate in the washing agent composition is to be suppressed, this can be achieved, for example, by embedding the granules in droplets of a whitish meltable substance ("water-soluble wax") or, preferably, by encapsulating the granules in a melt consisting of, for example, a water-soluble wax, as described in EP-B-0 323 407 B1, a white solid (e.g. titanium dioxide) being added to the melt in order to reinforce the masking effect of the capsule.

The detergent may also be formulated as an aqueous liquid comprising 5-50, preferably 10-35 wt-% of water or as a non-aqueous liquid detergent, containing not more than 5, preferably 0-1 wt-% of water. Non-aqueous liquid detergent compositions can contain other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerine, and 1,2-propanediol) can also be used. The compositions may contain from 5 wt-% to 90 wt-%, typically 10 wt-% to 50 wt-% of such carriers. The detergents can also be present as the so-called "unit liquid dose" form.

A further embodiment of the present invention is a fabric softener formulation comprising (a) at least one composition comprising at least one photocatalyst and at least one azo dyestuff and/or at least one triphenylmethane dyestuff, which produces a relative hue angle of 220-320° and and wherein the dyestuff is degraded when the composition is exposed to light, (b) at least one fabric softener.

A preferred embodiment of the present invention is a fabric softener formulation comprising (a) at least one composition comprising of at least one phthalocyanine compound of formula (1a), (1b), (2a), (3), (4), (4a), (5), (6) and/or (7), and at least one azo dyestuff of formulae

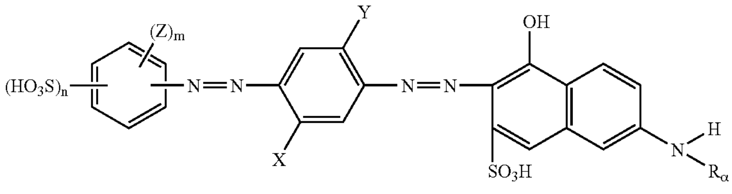

or

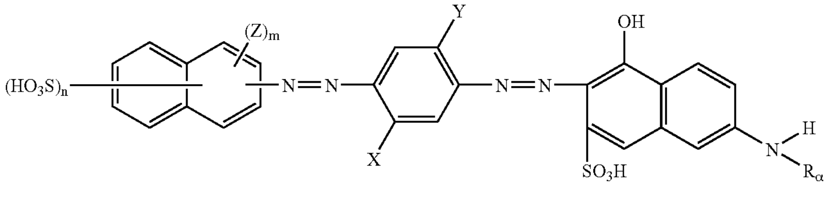

X and Y, independently of one another, are each hydrogen; $C_1$-$C_4$-alkyl or $C_1$-$C_4$-alkoxy, $R_\alpha$ is hydrogen or aryl, Z is $C_1$-$C_4$-alkyl; $C_1$-$C_4$-alkoxy; halogen; hydroxyl or carboxyl, n is 1 or2 and m is 0, 1 or 2, as well as the corresponding salts thereof and mixtures thereof and/or at least one triphenylmethane dyestuff of formula (D), (E), (F), (G), (H) and/or (I) as defined above, which produces a relative hue angle of 220-320° and and wherein the dyestuff is degraded when the composition is exposed to light, (b) at least one fabric softener.

An especially preferred embodiment of the present invention is a fabric softener formulation comprising (a) at least one composition comprising of at least one phthalocyanine compound of formula (1a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I) as defined above, which produces a relative hue angle of 220-320° and and wherein the dyestuff is degraded when the composition is exposed to light, (b) at least one fabric softener.

The preferences for the photocatalyst and the azo dyestuff as defined above also applies for the use in a fabric softener.

Fabric softeners, especially hydrocarbon fabric softeners, suitable for use herein are selected from the following classes of compounds:

(i) Cationic quaternary ammonium salts. The counter ion of such cationic quaternary ammonium salts may be a halide, such as chloride or bromide, methyl sulphate, or other ions well known in the literature. Preferably the counter ion is methyl sulfate or any alkyl sulfate or any halide, methyl sulfate being most preferred for the dryer-added articles of the invention.

Examples of cationic quatemary ammonium salts include but are not limited to:

(1) Acyclic quaternary ammonium salts having at least two $C_8$ to $C_{30}$, preferably $C_{12}$ to $C_{22}$ alkyl or alkenyl chains, such as: ditallowdimethyl ammonium methylsulfate, di(hydrogenated tallow)dimethyl ammonium methylsulfate, di(hydrogenated tallow)dimethyl ammonium methylchloride, distearyldimethyl ammonium methyl-sulfate, dicocodimethyl ammonium methylsulfate and the like. It is especially preferred if the fabric softening compound is a water insoluble quaternary ammonium material which comprises a compound having two $C_{12}$ to $C_{18}$ alkyl or alkenyl groups connected to the molecule via at least one ester link. It is more preferred if the quaternary ammonium material has two ester links present. An especially preferred ester-linked quaternary ammonium material for use in the invention can be represented by the formula:

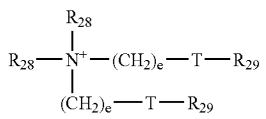

wherein each $R_{28}$ group is independently selected from $C_1$ to $C_4$ alkyl, hydroxyalkyl or $C_2$ to $C_4$ alkenyl groups; T is either —O—C(O)— or —C(O)—O—, and wherein each $R_{29}$ group is independently selected from $C_8$ to $C_{28}$ alkyl or alkenyl groups; and e is an integer from 0 to 5.

A second preferred type of quatemary ammonium material can be represented by the formula:

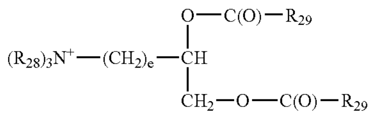

wherein $R_{14}$, e and $R_{15}$ are as defined above.

(2) Cyclic quaternary ammonium salts of the imidazolinium type such as di(hydrogenated tallow)dimethyl imidazolinium methylsulfate, 1-ethylene-bis(2-tallow-1-methyl) imidazolinium methylsulfate and the like;

(3) Diamido quaternary ammonium salts such as: methylbis(hydrogenated tallow amidoethyl)-2-hydroxethyl ammonium methyl sulfate, methyl bi(tallowamidoethyl)2-hydroxypropyl ammonium methylsulfate and the like;

(4) Biodegradable quaternary ammonium salts such as N,N-di(tallowoyl-oxy-ethyl)-N,N-dimethyl ammonium methyl sulfate and N,N-di(tallowoyl-oxy-propyl)-N,N-dimethyl ammonium methyl sulfate. Biodegradable quaternary ammonium salts are described, for example, in U.S. Pat. Nos. 4,137,180, 4,767,547 and 4,789,491 incorporated by reference herein.

Preferred biodegradable quaternary ammonium salts include the biodegradable cationic diester compounds as described in U.S. Pat. No. 4,137,180, herein incorporated by reference.

(ii) Tertiary fatty amines having at least one and preferably two $C_8$ to $C_{30}$, preferably $C_{12}$ to $C_{22}$ alkyl chains. Examples include hardened tallow-di-methylamine and cyclic amines such as 1-(hydrogenated tallow)amidoethyl-2-(hydrogenated tallow) imidazoline. Cyclic amines, which may be employed for the compositions herein, are described in U.S. Pat. No. 4,806,255 incorporated by reference herein.

(iii) Carboxylic acids having 8 to 30 carbons atoms and one carboxylic group per molecule. The alkyl portion has 8 to 30, preferably 12 to 22 carbon atoms. The alkyl portion may be linear or branched, saturated or unsaturated, with linear saturated alkyl preferred. Stearic acid is a preferred fatty acid for use in the composition herein. Examples of these carboxylic acids are commercial grades of stearic acid and palmitic acid, and mixtures thereof, which may contain small amounts of other acids.

(iv) Esters of polyhydric alcohols such as sorbitan esters or glycerol stearate. Sorbitan esters are the condensation products of sorbitol or iso-sorbitol with fatty acids such as stearic acid. Preferred sorbitan esters are monoalkyl. A common example of sorbitan ester is SPAN® 60 (ICI) which is a mixture of sorbitan and isosorbide stearates.

(v) Fatty alcohols, ethoxylated fatty alcohols, alkylphenols, ethoxylated alkylphenols, ethoxylated fatty amines, ethoxylated monoglycerides and ethoxylated diglycerides.

(vi) Mineral oils, and polyols such as polyethylene glycol.

These softeners are more definitively described in U.S. Pat. No. 4,134,838 the disclosure of which is incorporated by reference herein. Preferred fabric softeners for use herein are acyclic quaternary ammonium salts. Mixtures of the above mentioned fabric softeners may also be used.

The fabric softener formulation according to this invention comprises about 0.001-5 wt-%, preferably 0.001-3 wt-%, of at least one composition, which comprises at least one phthalocyanine compound of formula (1a), (1b), (2a), (3), (4), (4a), (5), (6) and/or (7), and at least one azo dyestuff of formulae

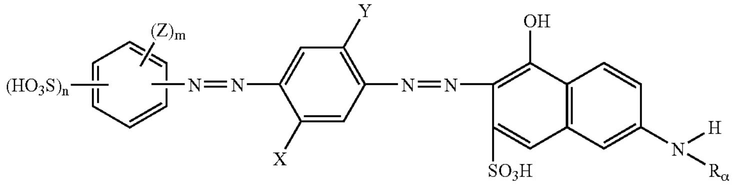

or

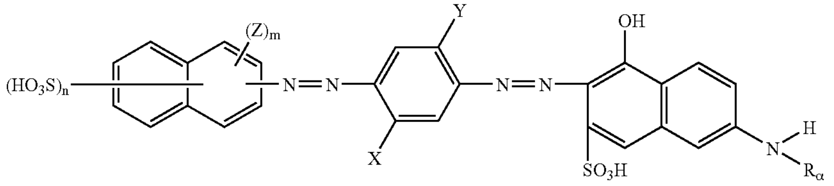

wherein

X and Y, independently of one another, are each hydrogen; $C_1$-$C_4$-alkyl or $C_1$-$C_4$-alkoxy, $R_\alpha$ is hydrogen or aryl, Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff of formula (D), (E), (F), (G), (H) and/or (I) as defined above, based on the total weight of the fabric softener formulation A preferred fabric softener formulation according to this invention comprises about 0.001-5 wt-%, preferably 0.001-3 wt-%, of at least one composition, which comprises at least one phthalocyanine compound of formula (1 a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I) as defined above, based on the total weight of the fabric softener formulation.

The fabric softener formulation employed in the present invention preferably contains about 0.1 to about 95 wt-%, based on the total weight of the fabric softening composition, of the fabric softener formulation. Preferred is an amount of 0.5 to 50 wt-%, especially an amount of 2 to 50 wt-% and most preferably an amount of 2 to 30 wt-%.

The fabric softening composition may also comprise additves which are customary for standard commercial fabric softening compositions, for example alcohols, such as ethanol, n-propanol, i-propanol, polyhydric alcohols, for example glycerol and propylene glycol; amphoteric and nonionic surfactants, for example carboxyl derivatives of imidazole, oxyethylated fatty alcohols, hydrogenated and ethoxylated castor oil, alkyl polyglycosides, for example decyl polyglucose and dodecylpolyglucose, fatty alcohols, fatty acid esters, fatty acids, ethoxylated fatty acid glycerides or fatty acid partial glycerides; also inorganic or organic salts, for example water-soluble potassium, sodium or magnesium salts, non-aqueous solvents, pH buffers, perfumes, dyes, hydrotropic agents, antifoams, anti redeposition agents, enzymes, optical brighteners, antishrink agents, stain removers, germicides, fungicides, dye fixing agents or dye transfer inhibitors (as described in WO-A-02/02865), antioxidants, corrosion inhibitors, wrinkle recovery or wet soiling reduction agent, such as polyorganosiloxanes. The latter two additives are described in WO0125385.

Such additives are preferably used in an amount of 0 to 30 wt-%, based on the total weight of the fabric softening composition. Preferred is an amount of 0 to 20 wt-%, especially an amount of 0 to 10 wt-% and most preferably an amount of 0 to 5 wt-%, based on the total weight of the fabric softening composition.

The fabric softener compositions are preferably in liquid aqueous form. The fabric softener compositions preferably contain a water content of 25 to 90 wt-%, based on the total weight of the composition. More preferably the water content is 50 to 90 wt-%, especially 60 to 90 wt-%.

A preferred embodiment of the present invention is a fabric softener formulation comprising (a) 0.001-5wt -% at least on composition comprising of at least one phthalocyanine compound of formula (1a), (1b), (2a), (3), (4), (4a), (5), (6) and/or (7), and at least one azo dyestuff of formulae

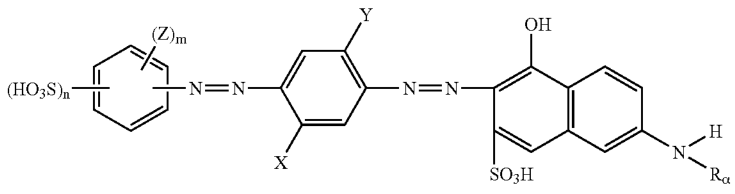

or

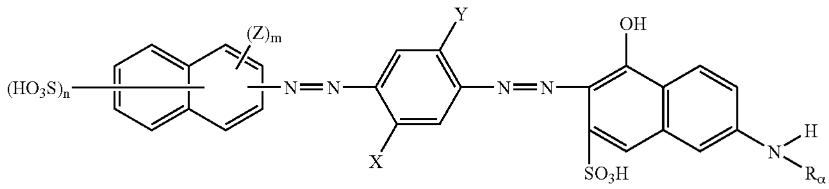

wherein

X and Y, independently of one another, are each hydrogen; $C_1$-$C_4$-alkyl or $C_1$-$C_4$-alkoxy, $R_\alpha$ is hydrogen or aryl, Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof and/or at least one triphenylmethane dyestuff of formula (D), (E), (F), (G), (H) and/or (I) as defined above, which produces a relative hue angle of 220-320° and and wherein the dyestuff is degraded when the composition is exposed to light, (b) 0.1-95 wt-% of at least one fabric softener selected from the above defined classes (i)-(vi), (c) 0-30 wt-% of at least one additive selected from the group consisting of alcohols; amphoteric and nonionic surfactants; inorganic or organic salts; non-aqueous solvents; pH buffers; perfumes, dyes; hydrotropic agents; antifoams; anti redeposition agents; enzymes; optical brighteners; antishrink agents; stain removers; germicides; fungicides; dye fixing agents or dye transfer inhibitors; antioxidants; corrosion inhibitors; wrinkle recovery or wet soiling reduction agent, and (d) 25-90 wt-% of water.

A more preferred embodiment of the present invention is a fabric softener formulation comprising (a) 0.001-5wt -% at least on composition comprising of at least one phthalocyanine compound of formula (1a), (1b), (2a), (3), (4), (4a), (5), (6) and/or (7), and at least one azo dyestuff of formula (A), (B), and/or (C) and/or at least one triphenylmethane dyestuff of formula (D), (E), (F), (G), (H) and/or (I) as defined above, which produces a relative hue angle of 220-320° and and wherein the dyestuff is degraded when the composition is exposed to light, (b) 0.1-95 wt-% of at least one fabric softener selected from the above defined classes (i)-(vi), (c) 0-30 wt-% of at least one additive selected from the group consisting of alcohols; amphoteric and nonionic surfactants; inorganic or organic salts; non-aqueous solvents; pH buffers; perfumes, dyes; hydrotropic agents; antifoams; anti redeposition agents; enzymes; optical brighteners; antishrink agents; stain removers; germicides; fungicides; dye fixing agents or dye transfer inhibitors; antioxidants; corrosion inhibitors; wrinkle recovery or wet soiling reduction agent, and (d) 25-90 wt-% of water.

The fabric softener compositions preferably have a pH value from 2.0 to 9.0, especially 2.0 to 5.0.

The fabric softener compositions can, for example, be prepared as follows:

Firstly, an aqueous formulation of the cationic polymer is prepared as described above. The fabric softener composition according to the invention is usually, but not exclusively, prepared by firstly stirring the active substance, i.e. the hydrocarbon based fabric softening component, in the molten state into water, then, where required, adding further desired additives and, finally, adding the formulation of the cationic polymer. The fabric softener composition can, for example, also be prepared by mixing a preformulated fabric softener with the cationic polymer.

These fabric softener compositions are traditionally prepared as dispersions containing for example up to 30 wt-% of active material in water. They usually have a turbid appearance. However, alternative formulations usually containing actives at levels of 5 to 40 wt-% along with solvents can be prepared as microemulsions, which have a clear appearance (as to the solvents and the formulations see for example U.S. Pat. No. 5,543,067 und WO-A-98/17757).

Examples of suitable textile fibre materials which can be treated with the liquid rinse conditioner composition are materials made of silk, wool, polyamide, acrylics or polyurethanes, and, in particular, cellulosic fibre materials and blends of all types. Such fibre materials are, for example, natural cellulose fibres, such as cotton, linen, jute and hemp, and regenerated cellulose. Preference is given to textile fibre materials made of cotton. The fabric softener compositions are also suitable for hydroxyl-containing fibres which are present in mixed fabrics, for example mixtures of cotton with polyester fibres or polyamide fibres. The following Examples serve to illustrate the invention without the invention being limited thereto. Parts and percentages are by weight unless specified otherwise. Temperature is given in degree Celsius unless specified otherwise.

EXAMPLES

Degradation Experiments

The aqueous mixture of the photocatalyst and the dyestuff or the components alone were exposed in the given concenctration in a closed 250 ml glass bottle, containing 125 ml of the mixture to sunlight. The intensity measured with a Roline RO-1322 Digital Lux meter in front of the bottles was within the range of 4500-6000 Lux.

The degradation of the components was determined from spectrophotometric data gained HP 8452 Diode array spectrophotometer. The absorption of the mixtures was measured at the respective absorption maximum of the components.

(Photocatalyst 670 nm, Dyestuff 550 nm). While there is only a small overlap of the two absorption spectrum at the maximum absorption of the photocatalyst at 670 nm, there may be an appreciable overlap at the absorption maximum of the dyestuff. The absorption was determined at the start and then every 2 hours. The loss after two hours is given in percentage of the initial concentration and is corrected where the overlap is considerable.

The used photocatalysts are

Photocatalyst 1: mixture of sulfonated Al- and Zn tetrabenzo-tetraaza-Porphyrines (Tinoluxe® BMC liq)

Photocatalyst 2: sulfonated Zn tetrabenzo-tetraaza-Porphyrine

The used dyestuffs are those of formula (A) and (B) as defined on epage 13.

The results are summarized in Table 1.

TABLE 1

| | Photocatalyst | Concentration Photocatalyst [μmol/l] | Dyestuff | Concentration Dyestuff [μmol/l] | Degradation of the Photocatalyst after 2 hours | Degradation of the Dyestuff after 2 hours |
|---|---|---|---|---|---|---|
| 1 | 1 | 3.6 | | | 11.69% | |
| 2 | 1 | 3.6 | B | 1.44 | 10.75% | 4.65% |
| 3 | 1 | 3.6 | B | 3.25 | 9.74% | 5.36% |
| 4 | 1 | 3.6 | B | 5.57 | 10.01% | 4.58% |
| 5 | 1 | 3.6 | B | 6.49 | 11.01% | 5.50% |

TABLE 1-continued

| | Photo-catalyst | Concentration Photocatalyst [μmol/l] | Dyestuff | Concentration Dyestuff [μmol/l] | Degradation of the Photocatalyst after 2 hours | Degradation of the Dyestuff after 2 hours |
|---|---|---|---|---|---|---|
| 6 | 1 | 3.6 | B | 30.30 | 8.61% | 3.63% |
| 7 | 1 | 18 | B | 7.21 | 6.43% | 6.72% |
| 8 | — | — | B | 4.33 | — | 0.20% |
| 9 | 2 | 3 | | | 17.19% | |
| 10 | 2 | 3 | B | 4.33 | 15.71% | 5.72% |
| 11 | 2 | 3 | A | 4.41 | 9.51% | 20.50% |
| 12 | — | — | A | 4.41 | — | 0.20% |
| 13 | 1 | 3.6 | A | 2.94 | 7.42% | 17.18% |
| 14 | 1 | 3.6 | A | 6.62 | 5.38% | 16.13% |
| 15 | 1 | 3.6 | A | 11.35 | 4.62% | 15.02% |
| 16 | 1 | 3.6 | A | 13.24 | 4.57% | 15.47% |
| 17 | 1 | 18 | A | 14.71 | 5.66% | 20.51% |

Determination of Hue Angle

The hue angle was determined from the experimental spectra of the starting mixture collected in the transmission mode, using the ordinary calculation modulus for the chosen light source (D 65 or A) and 10° observer. The mixtures are prepared in analogy to the Degradation Examples 1-17.

The results are summarized in Table 2

TABLE 2

| | Photo-catalyst | Concentration Photo-catalyst [μmol/l] | Dyestuff | Concentration Dyestuff [μmol/l] | Hue Angle D 65 | Hue Angle Light A |
|---|---|---|---|---|---|---|
| 18 | 1 | 3.6 | — | — | 201.17 | 207.00 |
| 19 | 1 | 3.6 | 2 | 1.44 | 223.68 | 222.52 |
| 20 | 1 | 3.6 | 2 | 3.25 | 248.89 | 240.14 |
| 21 | 1 | 3.6 | 2 | 5.57 | 269.50 | 257.22 |
| 22 | 1 | 3.6 | 2 | 6.49 | 276.34 | 263.29 |
| 23 | 1 | 3.6 | 2 | 30.30 | 307.23 | 299.40 |
| 24 | 2 | 3 | — | — | — | — |
| 25 | 2 | 3 | 2 | 4.33 | — | — |
| 26 | 2 | 3 | 1 | 4.41 | — | — |
| 27 | 1 | 3.6 | 1 | 2.94 | 256.37 | 244.51 |
| 28 | 1 | 3.6 | 1 | 6.62 | 287.85 | 275.13 |
| 29 | 1 | 3.6 | 1 | 11.35 | 300.69 | 291.83 |
| 30 | 1 | 3.6 | 1 | 13.24 | 303.50 | 295.70 |
| 31 | 1 | 3.6 | 1 | 61.786 | 317.24 | 315.78 |

The invention claimed is:

1. A composition comprising a mixture of a) at least one water-soluble phthalocyanine photocatalyst of formula 1(b) and b) at least one azo dyestuff and/or at least one triphenylmethane dyestuff, wherein (1b) is $$[Me]_q-PC-[Q_2]_r \quad (1b)$$

in which

PC is the phthalocyanine ring system;

Me is Zn; Fe(II); Ca; Mg; Na; K; Al-$Z_1$; Si(IV); P(V); Ti(IV); Ge(IV); Cr(VI); Ga(III); Zr(IV); In(III); Sn(IV) or Hf(VI);

$Z_1$ is a halide; sulfate; nitrate; carboxylate; alkanolate; or hydroxyl ion;

q is 0; 1 or 2;

r is any number from 1 to 4;

$Q_2$ is hydroxyl; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulfo or a carboxyl radical; a radical of the formula

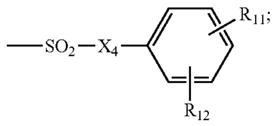
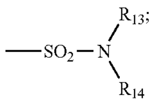
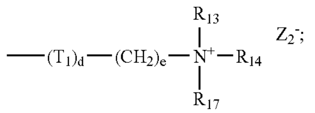
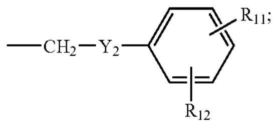
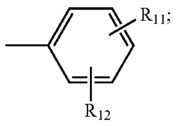

$-SO_2(CH_2)_v-OSO_3M$; $-SO_2(CH_2)_v-SO_3M$;

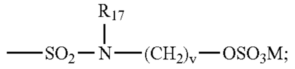
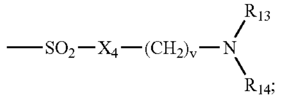
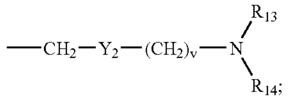
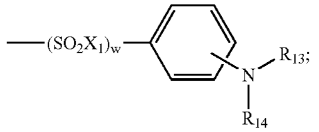
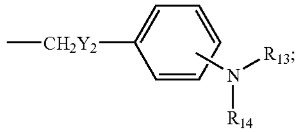
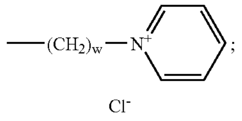
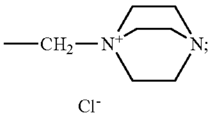
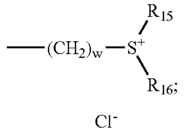
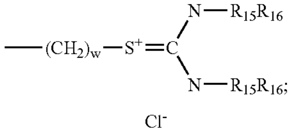

a branched alkoxy radical of the formula

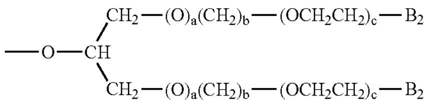

or

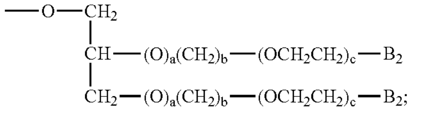

an alkylethyleneoxy unit of the formula an alkylethyleneoxy unit of the formula $-(T_1)_d-(CH_2)_b(OCH_2CH_2)_a$ $—B_3$ or an ester of the formula $COOR_{18}$ in which $B_2$ is hydrogen; hydroxyl; $C_1$-$C_{30}$alkyl; $C_1$-$C_{30}$alkoxy; $—CO_2H$; $—CH_2COOH$; $—SO_3^-M_1$; $—OSO_3^-M_1$; $—PO_3^{2-}M_1$; $—OPO_3^{2-}M_1$; and mixtures thereof;

$B_3$ is hydrogen; hydroxyl; $—SO_3^-M_1$; $—OSO_3^-M_1$,—COOH or $C_1$-$C_6$alkoxy;

$M_1$ is a water-soluble cation;

$T_1$ is —O—; or —NH—;

$X_1$ and $X_4$ independently of one another are —O—; —NH—or —N—$C_1$-$C_5$alkyl;

$R_{11}$ and $R_{12}$ independently of one another are hydrogen; a sulfo group and salts thereof, a carboxyl group and salts thereof or a hydroxyl group; at least one of the radicals $R_{11}$ and $R_{12}$ being a sulfo group and salts thereof; a carboxyl group or salts thereof, $Y_2$ is —O—; —S—; —NH—or —N—$C_1$-$C_5$alkyl;

$R_{13}$ and $R_{14}$ independently of one another are hydrogen; $C_1$-$C_6$alkyl; hydroxy-$C_1$-$C_6$alkyl; cyano-$C_1$-$C_6$alkyl; sulfo- $C_1$-$C_6$alkyl; carboxy or halogen-$C_1$-$C_6$alkyl; unsubstituted phenyl or phenyl substituted by halogen, $C_1$-$C_4$alkyl or $C_1$-$C_4$alkoxy; sulfo or carboxyl or $R_{13}$ and $R_{14}$ together with the nitrogen atom to which they are bonded form a saturated 5- or 6-membered heterocyclic ring which may additionally also contain a nitrogen or oxygen atom as a ring member;

$R_{15}$ and $R_{16}$ independently of one another are $C_1$-$C_6$alkyl or aryl -$C_1$-$C_6$alkyl radicals;

$R_{17}$ is hydrogen; an unsubstituted $C_1$-$C_6$alkyl or $C_1$-$C_6$alkyl substituted by halogen, hydroxyl, cyano, phenyl, carboxyl, carb-$C_1$-$C_6$alkoxy or $C_1$-$C_6$alkoxy;

$R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof;

M is hydrogen; or an alkali metal ion or ammonium ion, $Z_2^-$ is a chlorine; bromine; alkylsulfate or aralkylsulfate ion;

a is 0 or 1;

b is from 0 to 6;

c is from 0 to 100;

d is 0; or 1;

e is from 0 to 22;

v is an integer from 2 to 12;

w is 0 or 1;

where the phthalocyanine ring system may also comprise further solubilising groups, wherein the at least one azo dyestuff of formula is sectected from the group consisting of

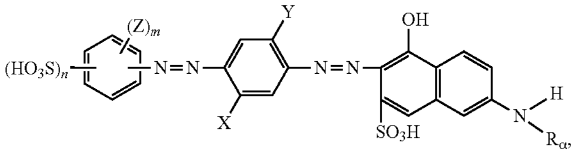

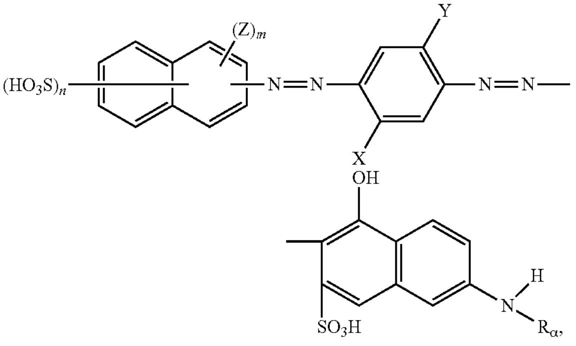

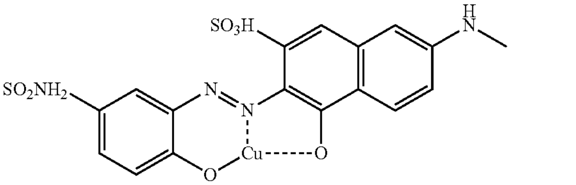

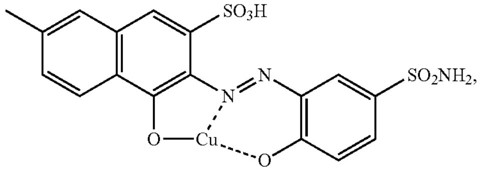

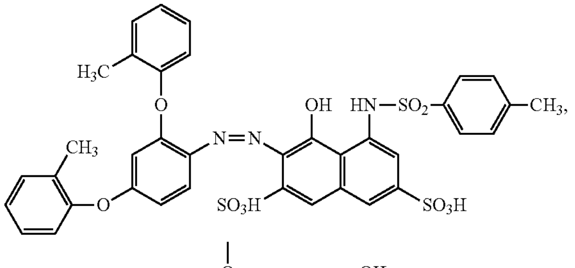

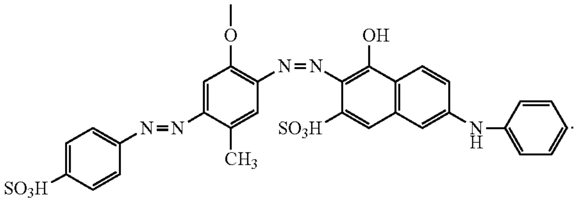

wherein

X and Y, independently of one another, are each hydrogen; $C_1$-$C_4$-alkyl or $C_1$-$C_4$-alkoxy, $R_\alpha$ is hydrogen or aryl, Z is $C_1$-$C_4$-alkyl; $C_1$-$C_4$-alkoxy; halogen; hydroxyl or carboxyl, n is 1 or 2 and m is 0, 1 or 2, as well as the corresponding salts thereof and mixtures thereof which composition produces a relative hue angle of 220-320 °, wherein the dyestuff component is degraded when the composition is exposed to sunlight and wherein the degradation rate of the azo dyestuff(s) and/or triphenylmethane dyestuff(s) is at least 1% per 2 hours.

2. The composition according to claim 1, comprising at least one triphenylmethane dyestuff of formula

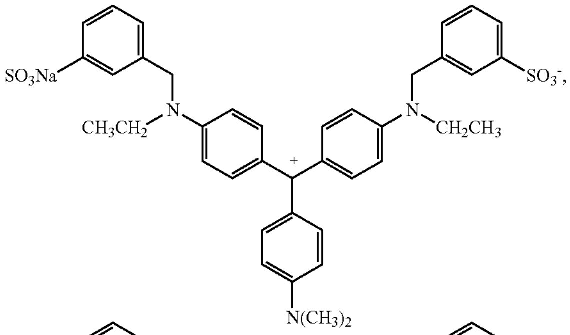
,

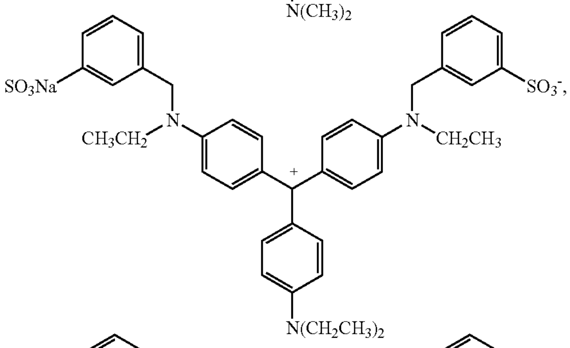
,

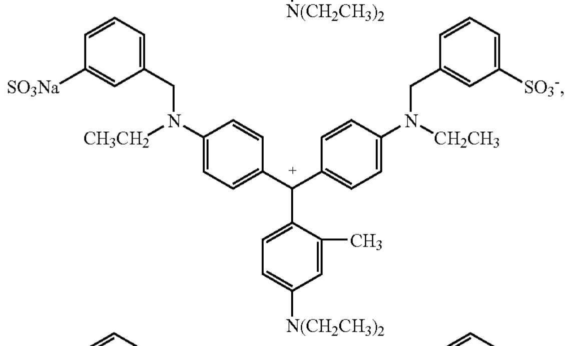
,

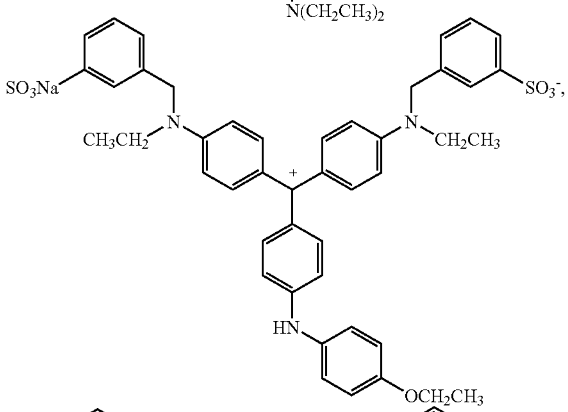
,

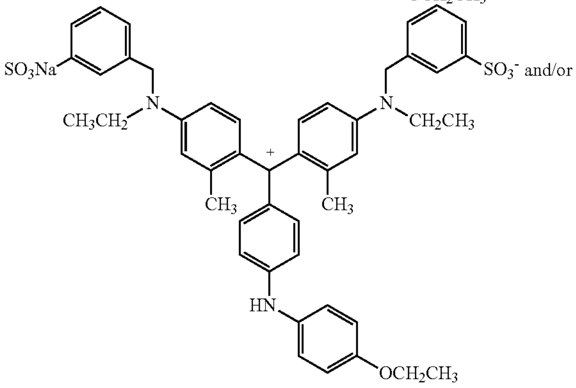
and/or

-continued

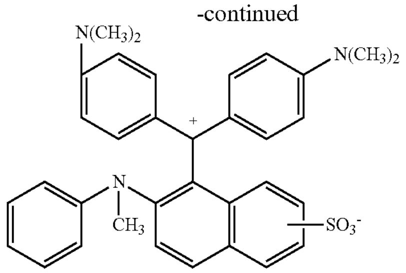

3. The composition according to claim 1, wherein at least one FWA is comprised.

4. A granular formulation comprising a composition according to claim 1.

5. The granular formulation according to claim 4 comprising a) from 2 to 75 wt-% of at least one water-soluble phthalocyanine compound and at least one azo dyestuff and/or at least one triphenylmethane dyestuff based on the total weight of the granulate, b) from 10 to 95 wt-% of at least one further additive, based on the total weight of the granulate, and c) from 0 to 15 wt-% water, based on the total weight of the granulate.

6. A liquid formulation comprising a composition according to claim 1.

7. A detergent formulation comprising

I) from 5 to 70 wt-% A) of at least one anionic surfactant and/or B) at least one non-ionic surfactant, based on the total weight of the washing agent formulation, II) from 5 to 60 wt-% C) of at least one builder substance, based on the total weight of the washing agent formulation, III) from 0 to 30 wt-% D) of at least one peroxide and, optionally, at least one activator, based on the total weight of the washing agent formulation, and IV) from 0.001 to 1 wt-% E) of at least one granulate which contains a) from 2 to 75 wt-% of at least one water-soluble phthalocyanine compound and at least one azo dyestuff and/or at least one triphenylmethane dyestuff as defined in claim 1, based on the total weight of the granulate, b) from 10 to 95 wt-% of at least one further additive, based on the total weight of the granulate, and c) from 0 to 15 wt-% water, based on the total weight of the granulate, V) from 0 to 60 wt-% F) of at least one further additive, and VI) from 0 to 5 wt-% G) water.

8. A softener composition comprising (a) a composition comprising at least one photocatalyst and at least one azo dyestuff and/or at least one triphenylmethane dyestuff, as defined in claim 1, and (b) a fabric softener.

9. A shading process for textiles or fabrics comprising treating the textile or fabric with the composition according to claim 1.

10. Textile treated with a composition as claimed in claim 1.

11. The composition according to claim 1, wherein the formula (1b) is the water-soluble phthalocyanine photocatalyst of formula (4)

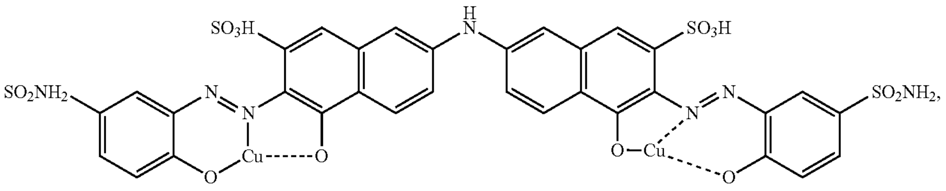

in which

PC is the phthalocyanine ring system;

Me is Zn; Fe(II); Ca; Mg; Na; K; Al-$Z_1$; Si(IV); P(V); Ti(IV); Ge(IV); Cr(VI); Ga(III); Zr(IV); In(III); Sn(IV) or Hf(VI);

$Z_1$ is a halide; sulfate; nitrate; carboxylate; alkanolate; or hydroxyl ion;

q is 0; 1; or 2;

$Y_3$' is hydrogen; an alkali metal ion or ammonium ion; and r is any number from 1 to 4.

12. The compositions according to claim 11, wherein the dyestuff is selected from the group consisting of

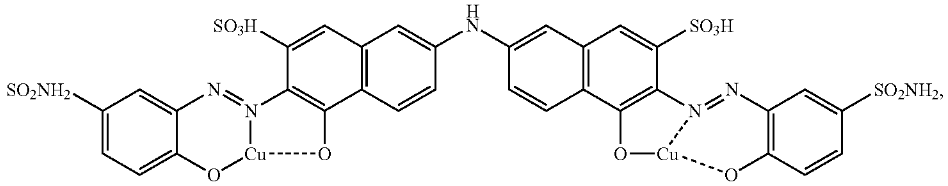

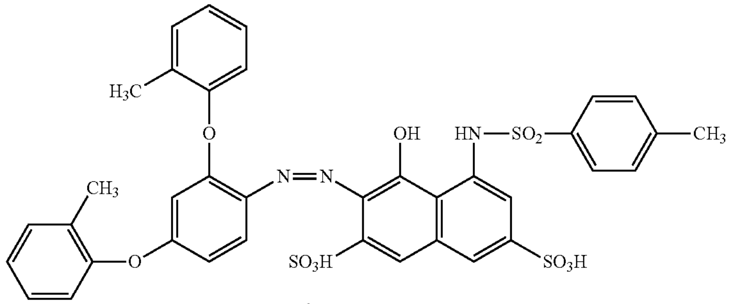

and

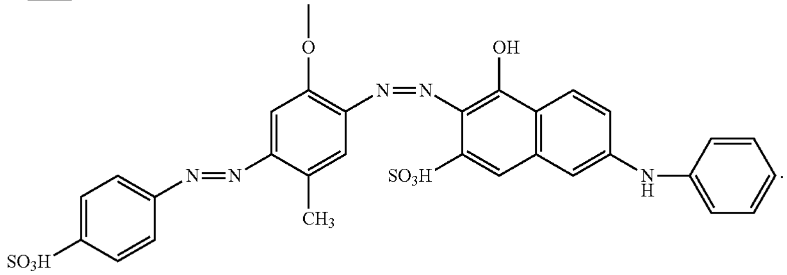

* * * * *